United States Patent [19]

Labeye-Voisin et al.

[11] 4,115,856
[45] Sep. 19, 1978

[54] INTERFACES FOR CONNECTING A DATA-PROCESSING UNIT TO A WORKING STATION

[75] Inventors: Gerard François Labeye-Voisin, Ste Gemmes sur Loire; Claude Hostein, Avrille, both of France

[73] Assignee: Compagnie Internationale pour l'Informatique Cii Honeywell Bull, Paris, France

[21] Appl. No.: 745,237

[22] Filed: Nov. 26, 1976

[30] Foreign Application Priority Data

Nov. 27, 1975 [FR] France .................... 75 36385

[51] Int. Cl.² .............................................. G06F 3/04
[52] U.S. Cl. .................................. 364/200; 340/147 R
[58] Field of Search ... 364/200 MS File, 900 MS File; 340/147 R, 147 LP, 147 SY; 179/15 AL

[56] References Cited

U.S. PATENT DOCUMENTS

| | | | |
|---|---|---|---|
| 3,697,959 | 10/1972 | Abramson | 364/200 |
| 3,725,871 | 4/1973 | Heuttner | 364/200 |
| 3,924,240 | 12/1975 | Given | 364/200 |
| 4,024,505 | 5/1977 | Sperling | 364/200 |

*Primary Examiner*—James D. Thomas
*Attorney, Agent, or Firm*—Lowe, King, Price & Becker

[57] ABSTRACT

An interface connects a data processing unit to at least one working station including data transmitting and receiving devices, such as peripheral devices. The interface includes a transmitter/receiver circuit for a station at the unit and a transmitter/receiver circuit associated with each of the devices. Data are transmitted between the circuit at the unit and the circuit at the device by a pair of transmission lines, whereby data are exchanged between the unit and the devices sequentially, character by character. Each of the characters is formed by the sequential transmission of bits along the lines. A dialogueing sequence between the unit and one of the devices is initiated when a first character is derived from the unit transmitter/receiver circuit. Each first character has a first predetermined bit having a predetermined value to indicate that the character is a first character, several bits for indicating an address of a transmitter/receiver circuit associated with each device connected to the unit, and a further predetermined bit having first and second values respectively indicative of single and multiple mode operation of the addressed transmitter/receiver circuit. The addressed circuit, when activated to the single mode, establishes a transmitting and receiving dialogue between the unit and only one device connected to the addressed transmitter and receiver circuit. In the multiple mode a pair of device transmitter/receiver circuits are addressed by two first characters having one sequence such that the device connected to one of the circuits is a transmitter and the device connected to the other circuit is a receiver. A dialogue is thereby established between the two devices through the data processing unit without using a large amount of memory space in the unit.

19 Claims, 16 Drawing Figures

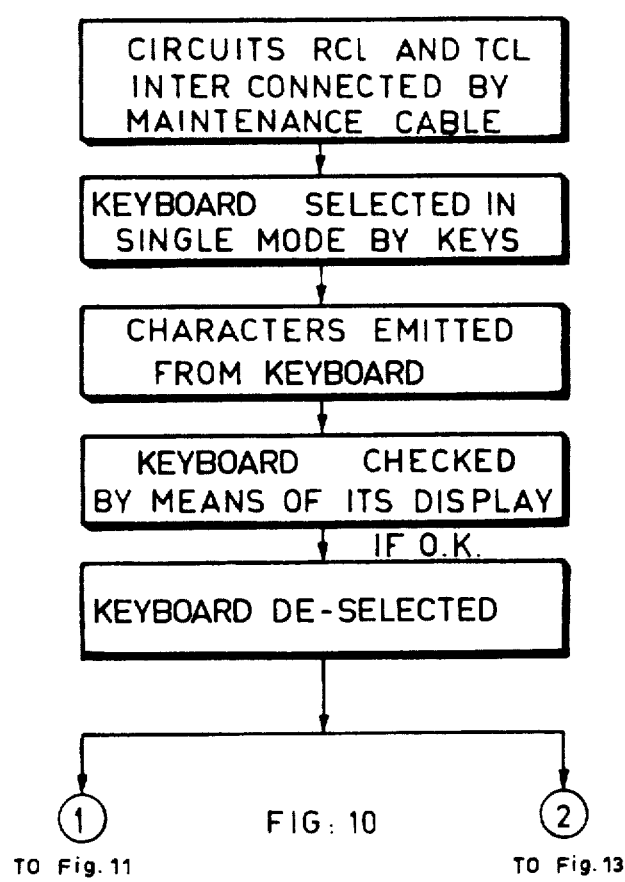

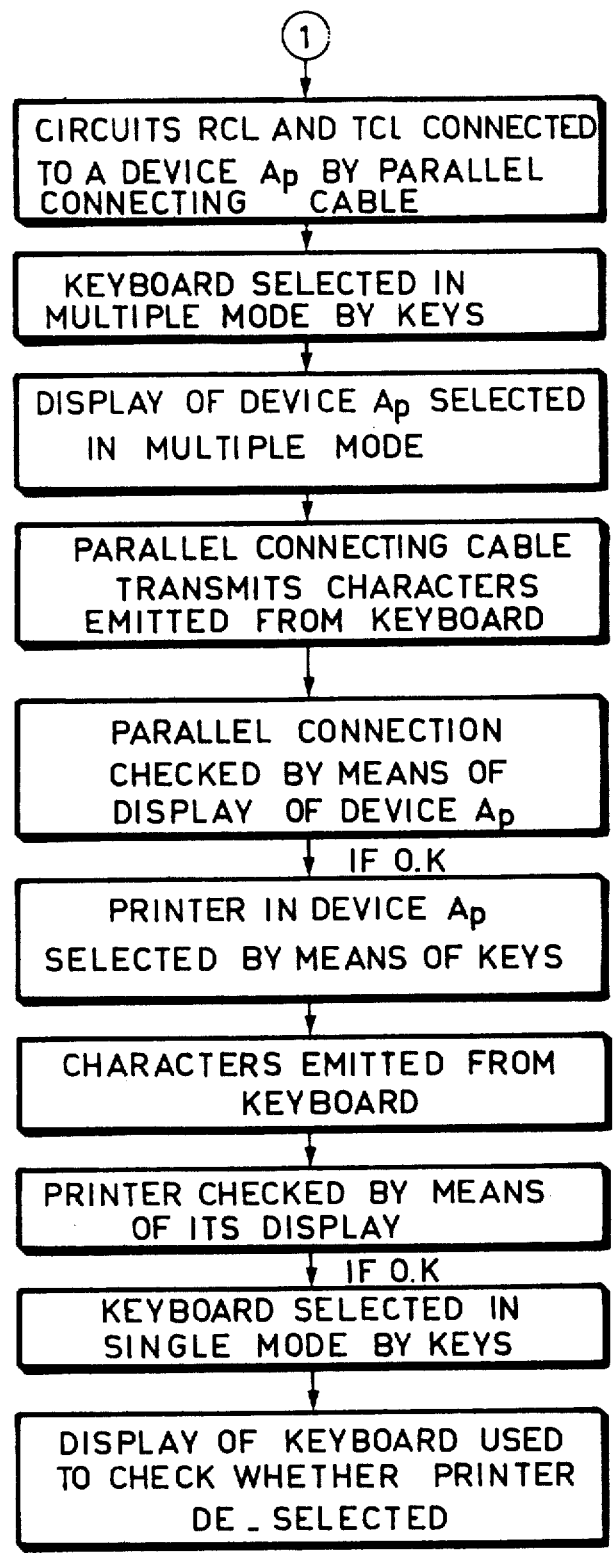
FIG:11

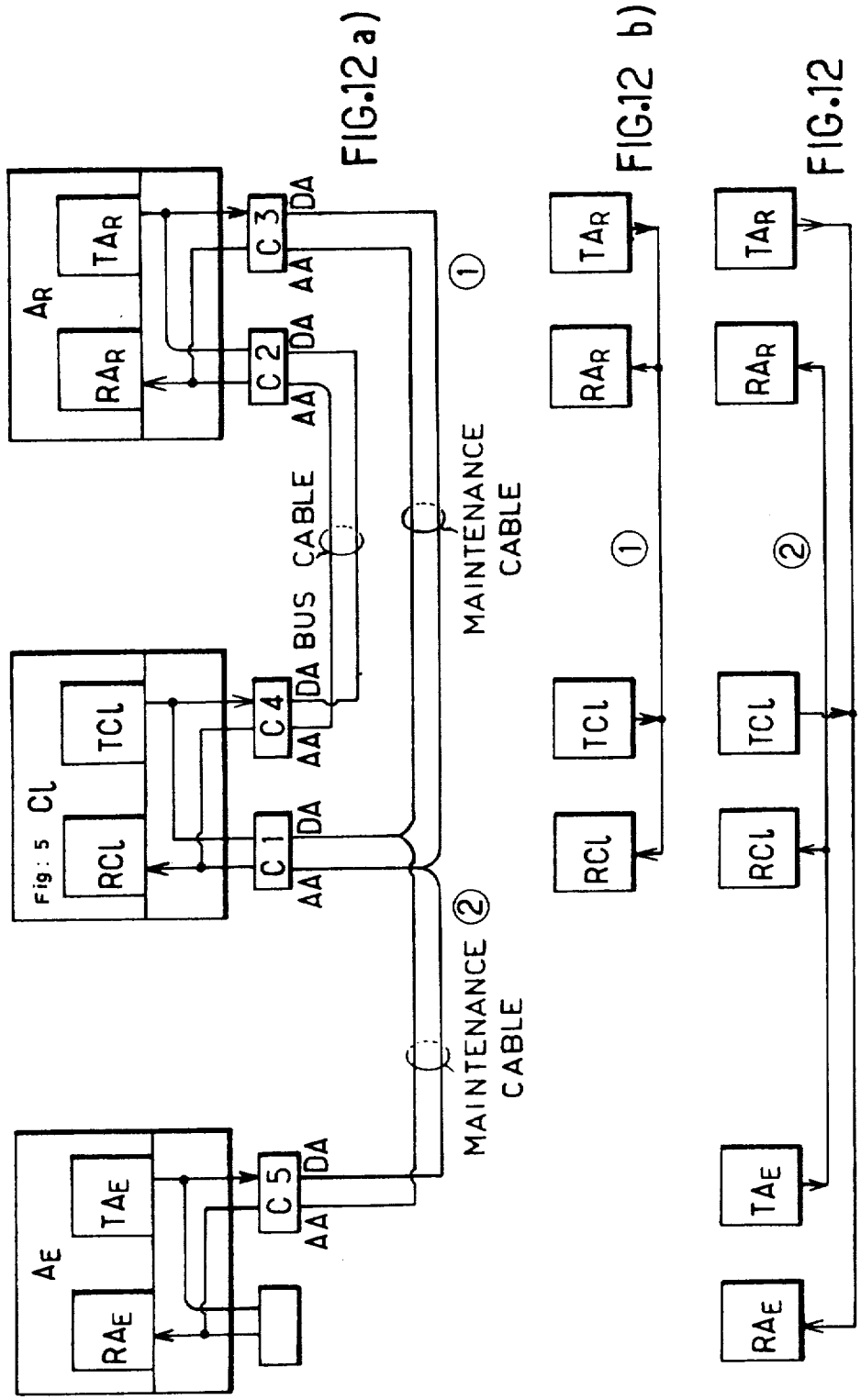

INTERFACES FOR CONNECTING A DATA-PROCESSING UNIT TO A WORKING STATION

FIELD OF THE INVENTION

The present invention relates to improvements in interfaces for connecting a data processing unit to at least one working station containing data emitting and receiving devices frequently referred to as peripheral devices.

BACKGROUND OF THE INVENTION

In one prior connection, known as a star connection, each of the devices at a working station is connected, by a cable associated with it, to the data processing unit with which the devices need to exchange data. The exchange of data between the unit and each device is the responsibility of pairs of transmitting and receiving circuits located at respective ends of the cable which connects the unit to the concerned device. Inputs and outputs to and from the unit are generally managed by running a program which is recorded in a memory of the unit. If the number of devices is large, then there is a large number of data transmitting and receiving circuits. This being the case, the amount of memory space required by the program is that much greater, to the detriment of the space which is left in the memory for performing routines which indicate the processing capacity of the unit.

In another prior connection, the various devices at a given working station are connected in series to the unit by a set of lines forming a single channel. Data between the unit and the device are exchanged along this connection, character by character, by transmitting the bits of each character in parallel. The advantage of this connection in comparison with a star connection is that it reduces the number of data transmitting and receiving circuits situated at the data processor end of the cable, whereby there is a reduction of the memory space for the program which manages the inputs and outputs of the processor.

In many applications, such as banking data-processing, slow devices are used at a peripheral working station. Slow devices are defined as devices which are only able to transmit and receive data at a speed lower than the speed with which the data processing unit is able to transmit and receive data. This being the case, it is not necessary for data which are exchanged during a dialogue sequence between the unit and a device to be transmitted at a speed higher than that at which the unit transmits and receives data. An interface particularly suitable in this instance is described in commonly assigned French patent application no. 7431212, filed on Sept. 16, 1974, which corresponds to U.S. application Ser. No. 622,466, filed Oct. 15, 1975. With a reduced number of transmission lines, and data transmitting and receiving circuits, and thus with a minimum amount of memory space required for the input/output management program, the required exchange of data occurs between slow devices and a processing unit, which may be a simple micro-processor. Such an interface enables a peripheral device, selected by the unit when a dialoguing sequence is initiated, to be operated as a data transmitter and a data receiver. However, with the prior art interface, if the data processing unit is required to transmit data received from a first device to another device, the unit must initiate another dialoguing sequence in which the other device is selected as a data receiver. For two devices to be able to exchange data through the circuit, it is therefore necessary for the unit to initiate two successive dialoguing sequences, whereby the respective initiating instructions for the two sequences must be stored in the memory of the unit.

One of the objects of the present invention is to enable data to be exchanged through a data processing unit between two devices at the same station using a minimum of means contained in the unit to which the station is connected by two transmission lines.

Another object of the invention is to enable data to be reliably exchanged between two devices at the same station which is connected to a data processing unit by two transmission lines.

BRIEF DESCRIPTION OF THE INVENTION

The invention provides an improved interface for connecting a data-processing unit to at least one working station including data transmitting and receiving devices. The interface is formed by a station transmitter/receiver circuit connected to the unit and by a transmitter/receiver circuit associated with each device. The station transmitter/receiver circuit is connected to the device transmitter/receiver circuits by two transmission lines in the same channel. The channel is connected to the station to enable data to be exchanged between the unit and devices, character by character, by transmitting the bits forming each character in series.

Communications between the data processing unit and the devices is via two operating modes. In one mode, termed the single mode, data are transmitted in either direction during one dialoguing sequence between the unit and only one device connected to a selected device transmitter/receiver circuit. In a second mode, termed the multiple mode, data are transmitted during the same sequence in opposite directions between the data processing unit and transmitting and receiving devices connected to a selected device transmitter/receiver circuit. A dialoguing sequence between the unit and a selected device transmitter/receiver circuit is initiated when a first character is transmitted from the unit and detected by the device transmitter/receiver circuits. Each first character contains bit indicating the address of the selected device transmitter/receiver circuit as well as a first bit to signify that it is a first character and a second bit to indicate single or multiple mode operation.

The interface contains means for enabling the unit to dialogue with devices connected to a selected transmitter/receiver circuit in the single and multiple modes. The enabling means is structured to respond to the first and second bits and the address bits of the selected devices' transmitter/receiver circuit. Selecting means, contained in the respective transmitter/receiver circuits of the devices, enables the device in question to dialogue exclusively with the unit in the single mode during a sequence. The selecting means also enables two devices connected to different selected transmitting and receiving circuits to dialogue with each other through the unit in the multiple mode during only one sequence which differs from the single mode sequence. The multiple mode sequence is initiated by establishing a pair of first characters at the beginning of the sequence. Each of these first characters contains first and second bits having predetermined binary values differing from the first and second bits for the first character of a single mode sequence. The two devices are respectively se-

BRIEF DESCRIPTION OF THE DRAWING

FIG. 10 is a flow chart showing the various stages of checking the correct functioning of device Cl of FIG. 9b by means of the maintenance cable of FIG. 9a;

FIG. 11 is a flow chart showing the various stages of checking the operating condition of the device of FIG. 9b and of its parallel interface with device Cl;

FIG. 12a is an illustration of a connection from device Cl to a device AR via a bus cable and a maintenance cable as, in FIG. 9a, to a device AE via a maintenance cable as in FIG. 9a;

FIG. 12b is an equivalent diagram of the interconnection between device Cl and device AR via bus and maintenance cables as in FIG. 9a;

FIG. 12c is an equivalent diagram of the interconnection between devices AE and AR via device Cl of FIG. 12a to which they are connected by the maintenance cable and bus cable respectively of FIG. 9a; and FIG. 13 is a flow chart showing the various stages of checking the operational condition of device AR and device AE by means of their connection to device Cl as in FIG. 12a.

DETAILED DESCRIPTION OF THE DRAWINGS

Figure 1:
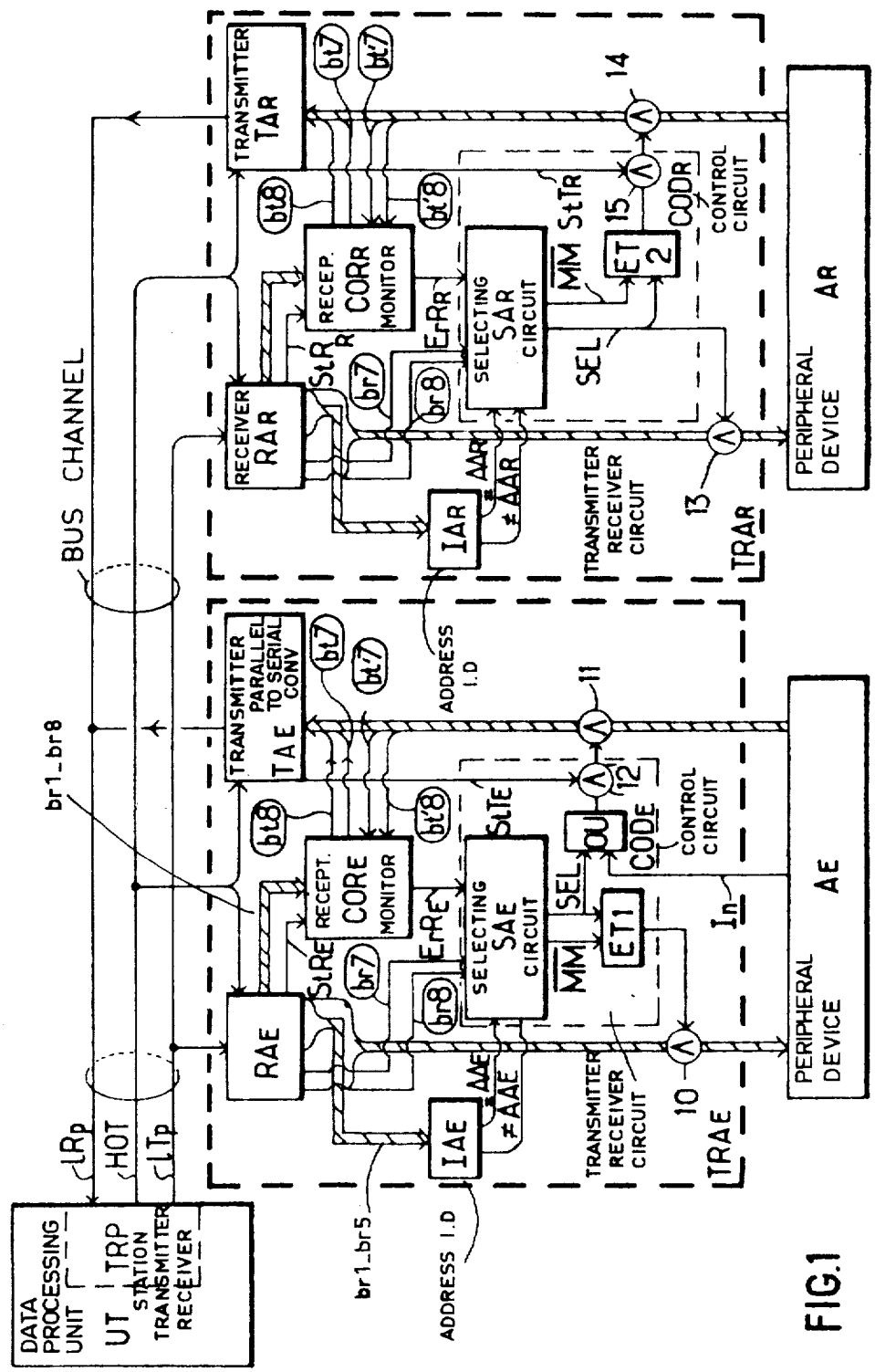
FIG. 1 is a general diagram of a connecting interface according to the invention.

Referring now to the drawings, an interface according to the invention, for connecting a data processing unit UT to a working station contains, as shown in FIG. 1, a station transmitter/receiver circuit TRP, two transmitter/receiver circuits TRAE and TRAR which are associated with respective ones of two peripheral devices AE and AR at the station in question and with a bus channel. Devices AE and AR are responsive to and derive multi-bit parallel characters which occur in sequence. In one embodiment, the input and output bits of each character are respectively denominated $br8$, $br7$, $br6$, $br5$, $br4$, $br3$, $br2$, $br1$ and $bt'8$, $bt'7$, $bt6$, $bt5$, $bt4$, $bt3$, $bt2$, $bt1$ for the devices AE and AR. The bus channel contains a transmission line lTp, along which the bits of each character emitted by circuit TRP are serially transmitted to receiver circuits RAE and RAR of a known kind; circuits RAE and RAR are respectively contained in circuits TRAE and TRAR. Along another transmission line lRp in the same channel, circuit TRP receives the bits of each character which is transmitted by transmitter circuits TAE and TAR (which are of a known kind); circuits TAE and TAR are respectively contained in circuits TRAE and TRAR. A third line HOT in the bus channel connects circuits TRP to circuits RAE and TAE for transmission in either direction between circuits TRP and TRAR. Along line HOT, synchronizing signals emitted by circuit TRP are transmitted to circuits TRAE and TRAR so that the transmission of bits along lines lRp and lTp takes place at the same frequency as the synchronizing signals.

Circuits TRAE and TRAR respectively contain character receiving circuits RAE and RAR, address identifying circuits IAE and IAR, control circuits CODE and CODR, circuits CORE and CORR for monitoring the reception of characters from the bus, and transmitter circuits TAE and TAR. Receiver circuits RAE and RAR convert each series bit of a multi-bit, series character which they receive from line lTp into a character containing parallel bits that are simultaneously derived from converters included in the receiver circuits. Circuits TAE and TAR convert multiple parallel bits of a single parallel character which are simultaneously supplied to them into multiple sequentially derived bits of a series character which are transmitted along line lRp. Circuit IAE responds to bits $br5$ - $br1$ of a parallel output character of circuit RAE to generate $a =$ AAE signal at a first output when a first parallel character of a sequence derived from circuit RAE contains the address AAE of device AE. A $\neq$AAE signal is generated at a second output of circuit IAE when the first parallel character derived from circuit RAE contains an address other than the address AAE of device AE. First characters of a sequence are identified in response to the value of a first bit, $br8$, derived from circuits RAE and RAR by circuitry described infra.

After each complete series character has been received by circuit RAE it is checked by circuit CORE in response to an enabling signal StRE being derived by circuit RAE when circuit RAE is ready to transmit the character in parallel. Circuit CORE supplies a signal ErRE to a selecting circuit SAE in circuit CODE when circuit CORE detects an error in a series character received by receiver RAE from line lTp.

First and second bits $br8$ and $br7$ from the first character received on line lTp by circuit RAE are fed to a circuit SAE. In response to the first bit $br8$ having a first binary value representing a dialogue request from unit UT, and $a = AAE$ signal being derived from circuit IAE, a first output of circuit SAE derives a binary one signal SEL to select device AE.

Depending on the value of bit $br7$, circuit SAE derives a binary one or a binary zero signal on a second output, $\overline{MM}$; if $\overline{MM} = 1$ selected device AE is operated in the single mode; if $\overline{MM} = 0$ selected device AE is operated in the multiple mode (MM). Two inputs of AND gate ET1, in control circuit CODE, are connected to the two outputs of circuit SAE so that the gate generates a control signal for selecting device AE in the single mode when signals $\overline{MM}$ and SEL are both binary ones. Parallel output characters (containing bits $br8$, $br7$, $br6$ ... $br1$) from circuit RAE are fed to device AE by transfer circuit 10, including an AND gate for each bit of the parallel character, when circuit 10 is enabled by a binary one at the output of gate ET1. Thus, device AE is selected to act as a data receiver as a result of its address AAE being identified by circuit IAE and in response to bits $br8$ and $br7$ having specific values which enable circuit CODE to generate a control signal to activate device AE in the single mode.

In the event of an error being detected when the first series character is received by circuit RAE, the presence of signal ErRE at one input of circuit SAE prevents the latter from generating a binary one SEL signal. This being the case, the transfer of characters to device AE via circuit 10 is barred by the output from gate ET1.

An OR gate OU contained in circuit CODE has a first input connected to be responsive to the SEL output of circuit SAE and an In output of device AE; device AE derives a binary one In output when it makes an interruption request to unit UT. Gate OU generates a binary one output signal when either of signals SEL or In is present. Transfer circuit 11 (circuit 11 and all other transfer circuits are similar to transfer circuit 10) feeds a parallel output character (containing bits $bt'8$, $bt'7$, $bt6$ . . . $bt1$) from device AE to parallel-character inputs of circuit TAE, when the transfer circuit is enabled by a binary one output signal that is coupled from gate OU to circuit 11 via AND gate 12. AND gate 12 feeds the output of gate OU to circuit 11 when signal StTE, derived from circuit TAE, has a binary one value. Signal StTE has a binary one value whenever a parallel character input of the circuit TAE is ready to receive a fresh character. Thus, device AE is selected to act as a data transmitter either: (1) when signal SEL is present, regardless of whether the selection mode required by unit UT is single or multiple; or (2) when signal In is present, which signal is used by device AE to make an interruption request to unit UT. In the event of an error being detected when a character other than the first character is received from line lTp, a dialogue which is occurring between device AE and unit UT is interrupted in response to circuit SAE sensing the error and deriving a binary zero value for signal SEL, which disables transfer circuits 10 and 11 to prevent device AE from either transmitting or receiving data.

First and second bits $bt'8$ and $bt'7$ in each character derived from device AE and fed through circuit 11 are supplied to two inputs of circuit CORE. In response to an error being detected by circuit CORE, the presence of signal ErRE at one input of circuit SAE causes signal SEL to have a binary zero value to block the transfer of data by circuit 11, whereby input bits $bt'8$ and $bt'7$ to circuit CORE have zero values. Circuit CORE responds to the zero values of bits $bt'8$ and $bt'7$ to derive a pair of output bits $bt8$ and $bt7$ having predetermined binary values indicative of $bt'8 = bt'7 = 0$; output bits $bt8$ and $bt7$ of circuit CORE are coupled to input terminals of circuit SAE as the first and second bits of each parallel character. The predetermined values of bits $bt8$ and $bt7$ in a character which is transmitted to unit UT along line lRp indicate to the unit that an error has been detected by circuit CORE.

Circuits RAR, IAR, CORR and circuit SAR, contained in circuit CODR, are respectively similar to circuits RAE, IAE, CORE and SAE. Thus, signals SEL and $\overline{MM}$ are generated at outputs of circuit SAR in response to bits $br8$ and $br7$, derived by circuit RAR, having predetermined values which indicate that a first character indicating single mode operation has been received and in response to circuit IAR identifying address AAR of device AR. If, on the other hand, circuit IAR identifies an address other than address AAR in the first character emitted by circuit RAR, circuit IAR transmits $a \neq AAR$ signal to circuit SAR; the $\neq AAR$ signal either prevents device AR from being selected or deactivates device AR after it has been activated for single mode operation. Signal SEL can be derived at an output of circuit SAR, if multiple mode operation has been signalled, even if a $\neq AAR$ signal is generated. Since signal SEL enables transfer circuit 13, by which parallel-character outputs of circuit RAR are supplied to device AR, device AR can act as a data receiver regardless of whether unit UT requests the single selection mode or the multiple mode.

In response to SEL and $\overline{MM}$ outputs of circuit SAR both having binary one values, AND gate ET2, in control circuit CODR, generates a control signal for selecting device AR in the single mode. Parallel input characters are supplied to circuit TAR from device AR through transfer circuit 14 which is enabled by the output of gate ET2, as coupled through AND gate 15 when signal StTR is present. Signal StTR is emitted by circuit TAR whenever circuit TAR is ready to receive a fresh parallel input character. Thus, device AR is activated as a data transmitter only when a control signal for single mode selection is present at the output of gate ET2.

Circuit CORR checks all the series characters received from line lTp each time circuit CORR receives an enabling signal StRR from circuit RAR; signal StRR indicates that a parallel character is ready to be derived from circuit RAR. When circuit CORR detects an error during reception of a first character, it generates a signal ErRR which is coupled to circuit SAR to prevent derivation of signal SEL at an output of circuit SAR; selection of device AR is thereby prevented. If however, device AR has already been selected in response to the first character and an error in a subsequent character is detected by circuit CORR, the bits $bt'8$ and $bt'7$ emitted by device AR are forced to assume predetermined bit values $bt8$ and $bt7$, which are fed to the parallel-character inputs of circuit TAR. The imposed values of bits $bt8$ and $bt7$ in a character are transmitted to unit UT along line lRp to indicate to the unit that an error has been detected by circuit CORR in the course of the dialogue with device AR.

It is thus noted that circuit TRAR differs from circuit TRAE since transfer circuit 13 is enabled directly and only by the SEL signal derived from circuit SAR, while transfer circuit 10 is enabled only in response to the $\overline{\text{MM}}$ and SEL outputs of circuit SAE both having binary one values. Further, device AR does not derive an interrupt signal and transfer circuit 14 can be enabled only when the $\overline{\text{MM}}$ and SEL outputs of circuit SAR have binary one values; in contrast, transfer circuit 11 can be enabled when either the In output of device AE or the SEL output of circuit SAE has a binary one value.

Figure 2:
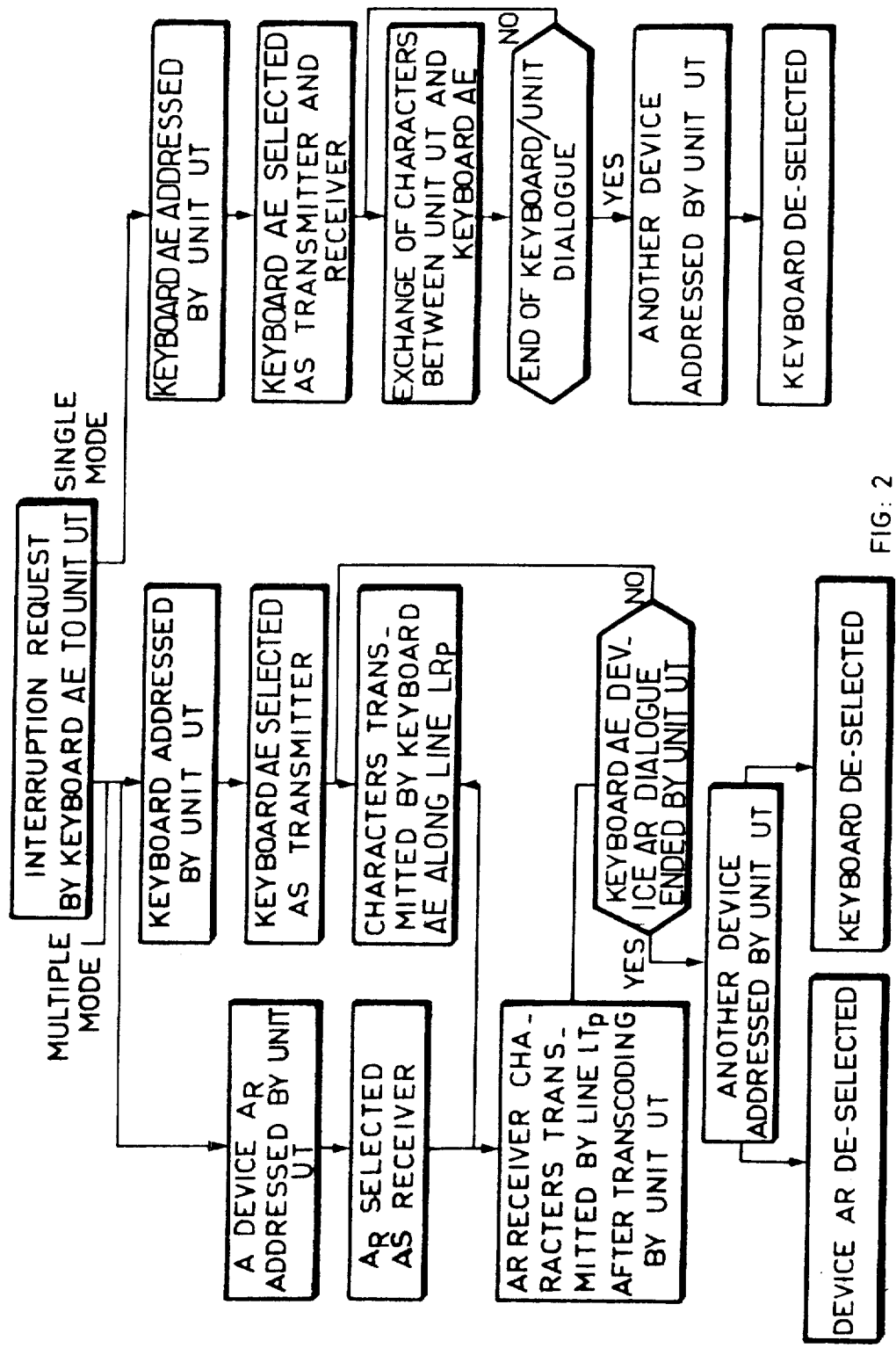
FIG. 2 is a flow chart wherein there is illustrated the progress of dialogues between a keyboard and the unit in single and multiple modes according to the invention.

In FIG. 2 is illustrated a flow diagram of the progress of a dialogue between a keyboard (which has been chosen as the transmitter device AE but which is also designed to display data by means of visual indicators) and a data processing unit UT, using the interface improvement shown in FIG. 1. Two modes of operation, single and multiple, are illustrated in FIG. 2. Dialogues between the keyboard and unit UT in both modes occur in response to an interruption request, which the keyboard makes to unit UT by emitting the signal In shown in FIG. 1.

The first step in a dialoguing sequence between keyboard AE and unit UT in the single mode occurs when the unit addresses the keyboard by transmitting, along line 1Tp, a first character containing the keyboard address. When bits $br8$ and $br7$ of the first character have the same predetermined values, to indicate the single mode, the addressed keyboard AE is activated to act as a character receiver and transmitter. The exchange of characters between unit UT and keyboard AE takes place as the dialoguing sequence continues until the unit transmits, along line 1Tp, a final character which brings the dialogue to an end. Another device, e.g., device AR, is addressed by unit UT since the final character which is transmitted along line 1Tp contains the address of another device. Keyboard AE is thus no longer selected because an address of a peripheral device other than the address of the keyboard has been identified.

A dialogue in only one sequence between keyboard AE and device AR through unit UT occurs in the multiple mode. The first operation of the multiple mode sequence occurs when unit UT addresses keyboard AE and device AR by successively transmitting along line 1Tp an initial first character containing the address of the keyboard and a second, first character containing the address of device AR. The multiple mode is signalled because $br8$ and $br7$ contained in both the initial and second first characters have predetermined different values. When the multiple mode is signalled, keyboard AE is activated to act as a character transmitter and device AR is activated to act as character receiver.

In a preferred embodiment of the invention, a binary one value is assigned to bit $br8$ to signal a first character and cause a device to be selected; the second bit $br7$ has binary one and zero values respectively when the selected device is to be operated in the single and multiple modes. Once keyboard AE and device AR have been activated to operate in the multiple mode by the second bit $br7$ of the initial and second first characters being a binary zero, the keyboard transmits characters along line 1Rp. These characters are re-coded by unit UT before being transmitted to device AR along line 1Tp. Characters are thus exchanged between keyboard AE and device AR until unit UT transmits along line 1Tp a final character which brings the dialogue between keyboard AE and device AR to an end. Another device is addressed by unit UT when unit UT transmits the final character (which brings the multiple mode dialogue to an end since $br8$ and $br7$ of a final character are both equal to one) along line 1Tp. The final character contains the address of the other devices, whereby keyboard AE and device AR are no longer selected as a result of $\neq$AAE and $\neq$AAR signals being respectively derived from circuits IAE and IAR.

Figure 4:
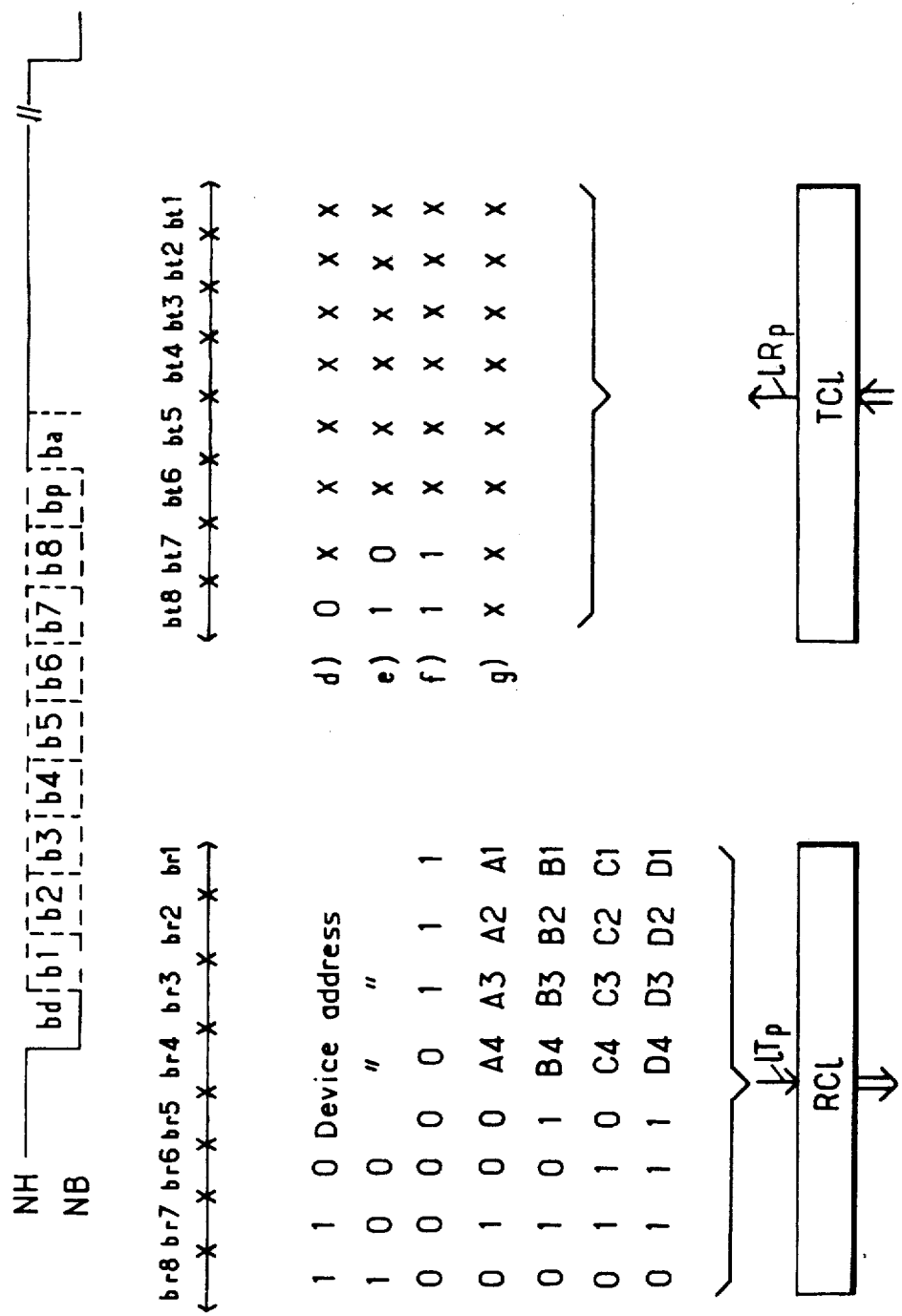
FIG. 4 are illustrations of examples of the formats of the characters which are respectively emitted and received by the transmitter/receiver circuit of a device Cl which is connected to the bus in FIG. 1.

Before describing circuits of the interface in greater detail, consideration is given to FIG. 4 wherein there is illustrated a preferred format for characters which are derived from and received by the device at a station which is connected to unit UT.

In FIG. 4 are examples of the format of characters which are derived from and received by the devices at a station which is connected to unit UT. In FIG. 4 are also shown the various types of characters which are respectively received and emitted by receiver and transmitter circuits RCl and TCl (described infra in connection with FIG. 5) of a keyboard which is selected as device Cl.

Each character transmitted long lines 1Tp and 1Rp contains a first, start bit $bd$, eight information bits ($b1, b2 \ldots b8$), a parity bit $bp$, and a stop bit $ba$. The start bit $bd$ is at a low level NB which is preceded by a high level NH. When received by circuit RCl the leading edge of the transition from the high to the low level may also be used for local synchronization purposes to avoid the use of line HOT, particularly in the case of long distance transmissions. Stop bit $ba$ is at the high level NH and is followed by the high level which separates adjacent sequential characters transmitted along the same line.

The information contained in the various types of characters, represented by cases $(a1)$, $(a2)$ $(b)$, $(c0)$, $(c1)$, $(c2)$, $(c3)$, $(d)$, $(e)$, $(f)$, $(g)$, depends on predetermined binary values (1 or 0) of bits $b1$ to $b8$ or on indeterminate values (1 or 0) thereof; the indeterminate values are indicated in FIG. 4 by the letter X. Cases $(a1)$ and $(a2)$, wherein bits $br8$ and $br7$ respectively have values of 1, 1 and 1, 0, represent first characters for activating devices in the single and multiple modes respectively; the 1 value of bits $br8$ indicates a first character and the values of bit $br7$ indicate the mode. Case $(b)$, where bits $br8$ and $br7$ are 0, represents a status request issued by unit UT for the device addressed by the first character. Cases $(c0)$, $(c1)$, $(c2)$ and $(c3)$, respectively represent orders for four different registers A, B, C, D associated with output element of a device to be loaded; bits $br8$ and $br7$ are 0 and 1, bits $br6$ and $br5$ have values of 0,0; 0,1; 1,0; and 1,1 to indicate which of the registers is selected and bits $br4$ - $br1$ indicate the signal supplied to the selected register. Case $(d)$, where bit $bt8$ has a 0 value, and bits $bt1$ - $bt7$ may have any value, represents data transmitted from the selected device to unit UT along line 1Rp. Case $(e)$, where bits $bt8$ and $bt7$ are respectively 1 and 0, represents an interruption request being made by a keyboard (e.g., by device AE in FIG. 1 emitting signal In). Case $(f)$, where bits $bt8$ and $bt7$ are both 1 and bits $bt1$ to $bt6$ may have any value, represents an error in the transfer of signals along line 1Tp which is detected when the character is received by circuit TRCl. Case $(g)$, where none of bits $bt1$ to $bt8$ is of a specific value, represents an error in the transfer of data from the selected device to unit UT along line 1Rp, wherein the error is detected when the character is received by circuit TRP of the unit.

Figure 3:
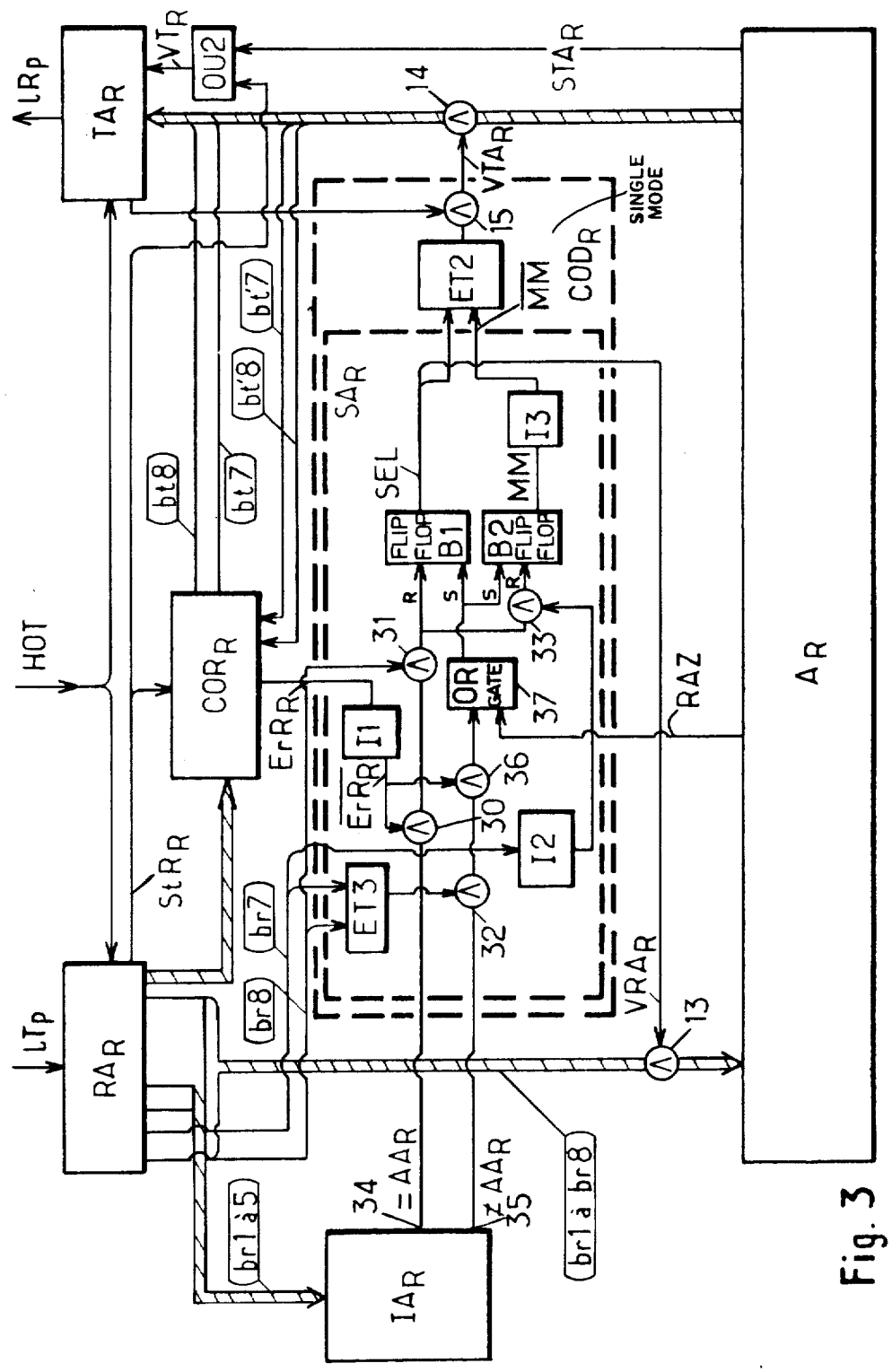
FIG. 3 is a block diagram of an embodiment of a transmitter/receiver circuit which is associated with a device to enable it to be selected as a data receiver in a multiple mode according to the invention.

As shown in FIG. 3, mode selecting circuit SAR contained in circuit CODR of FIG. 1 responds to bits $br8$ and $br7$ to determine if (1) a first character has been received by receiver RAR from unit UT, and (2) to activate the station into the single or multiple mode in response to the value of $br7$, if $br8 = 1$. Circuit SAR includes two flip-flops B1 and B2, each having two inputs (R and S) which are respectively connected to $-\text{AAR}$ and $\neq\text{AAR}$ outputs of circuit IAR at terminals 34 and 35. Each of flip-flops B1 and B2 has a single output on which are respectively derived signals SEL and MM. Signal MM is inverted by inverter I3 to derive signal $\overline{\text{MM}}$, Signals $\overline{\text{MM}}$ and SEL are coupled to a pair of inputs of AND gate ET2, FIGS. 1 and 3.

Flip-flops B1 and B2 are initially set to a first state by a zero-resetting signal RAZ which is derived from device AR. Signal RAZ is derived from device AR in response to a manual command being supplied to device AR to set the device to an initial state. Signal RAZ is coupled to the set input terminals (s) of flip-flops B1 and B2 via OR gate 37. Flip-flops B1 and B2 are selectively activated to a second state in response to circuit IAR deriving an $=\text{AAR}$ signal when the circuit identifies address AAR. The $=\text{AAR}$ signal is selectively coupled to the R inputs of flip-flops B1 and B2 to activate the flip-flops to the second state. In response to flip-flops B1 and B2 being in the second state, the SEL and $\overline{\text{MM}}$ output signals thereof have binary one values, in contrast to the binary zero values of these signals when the flip-flops are in the first state. If both flip-flops B1 and B2 are in the initial state (neither of signals SEL and $\overline{\text{MM}}$ is derived) device AR has not been addressed. If flip-flops B1 and B2 are respectively in the second and initial states, device AR has been selected and is to be activated in the multiple mode. If flip-flops B1 and B2 are both in the second states, device AR has been selected and is to be activated in the single mode. The circuitry for activating flip-flops B1 and B2 to these states and for responding to the outputs of the flip-flops is now to be described.

To activate flip-flop B1 into the second state, the $=\text{AAR}$ signal derived from output 34 of circuit IAR is only coupled to the R inputs of flip-flop B1 when AND gates 30 and 31 are respectively enabled by signal $\overline{\text{ErRR}}$ and by a binary one value of bit $br8$ being derived by circuit RAR. In the preferred embodiment of the invention, a binary one value for bit $br8$ represents an order from unit UT for a device to be selected and is thus characteristic of a first character. The $\overline{\text{ErRR}}$ signal is generated from the output of an inverter I1 in circuit SAR when the input of the latter, which is connected to circuit CORR, does not receive a signal $\overline{\text{ErRR}}$; hence signal $\overline{\text{ErRR}}$ indicates that no error has been detected in the character coupled by circuit RAR to circuit CORR. The output of flip-flop B1 is connected to circuit 13 of FIG. 1 so that circuit 13 is enabled by signal SEL, which is designated VRAR at the input to circuit 13. Device AR is thus enabled as a character receiver, regardless of whether the selected device is activated to the single or multiple mode.

To activate flip-flop B2 so that it is switched from its initial to its second state to indicate multiple mode operation, wherein the flip-flop output $\overline{\text{MM}}$ has a binary one value, the $=\text{AAR}$ signal at output 34 of circuit IAR is coupled by circuits 30 and 31 and by AND gate 33 to the R input terminal of the flip-flop. AND gate 33 is enabled by an inverter I2, connected to the output of circuit RAR, in response to bit $br7$ derived from circuit RAR having a 0 value, to activate device AR to the multiple mode. The $\overline{\text{MM}}$ output signal of flip-flop B2 is coupled via inverter I3 to an input of AND gate ET2, to disable the AND gate so that signals cannot be coupled from device AR to transmitter TAR through transfer circuit 14 while device AR is operated in the multiple mode. In contrast, in response to gates 30 and 31 being enabled while gate 33 is enabled in response to $br7 = 1$, flip-flop B2 remains in its initial state so that no MM output signal is derived thereby to indicate the signal mode. If no MM signal is derived from flip-flop B2, AND gate ET2 is enabled because of the connection from the flip-flop output to gate ET2 through inverter I3. A signal VTAR is generated at the output of gate ET2 when signals SEL and $\overline{\text{MM}}$ are respectively derived from flip-flop B1 and inverter I3.

To return flip-flops B1 and B2 to the initial state when device AR is no longer selected, the $\neq\text{AAR}$ output of circuit IAR, at terminal 35, is coupled through AND gates 32 and 36 to the S input terminals of the flip-flops via OR gate 37. Gate 32 is enabled by the output of AND gate ET3, which in turn is responsive to output bits $br8$ and $br7$. Circuit 32 is enabled when bits $br8$ and $br7$, as coupled to gate ET3, are both 1, which represents an order from the unit UT (first character) for a device to be activated in the single mode. The selected device is not device AR since $\neq\text{AAR}$ signal is derived. If no error in the character is detected, whereby signal $\overline{\text{ErRR}}$ is derived from inverter I1, gate 36 is enabled and flip-flops B1 and B2 are returned to the initial state.

Signal VTAR, at the output of gate ET2, enables circuit 14 via circuit 15. Device AR is thus enabled to act as a character transmitter when signals SEL and $\overline{\text{MM}}$ are present at the inputs of gate ET2, i.e., solely in the single mode. Circuit TAR is enabled to transmit the characters from device AR in response to OR gate OU2 generating an enabling signal VTR when signal StRR or StAR is derived from either circuit RAR or device AR. Device AR derives signal StAR when, for example, any key on a keyboard thereof is struck.

Figure 5:
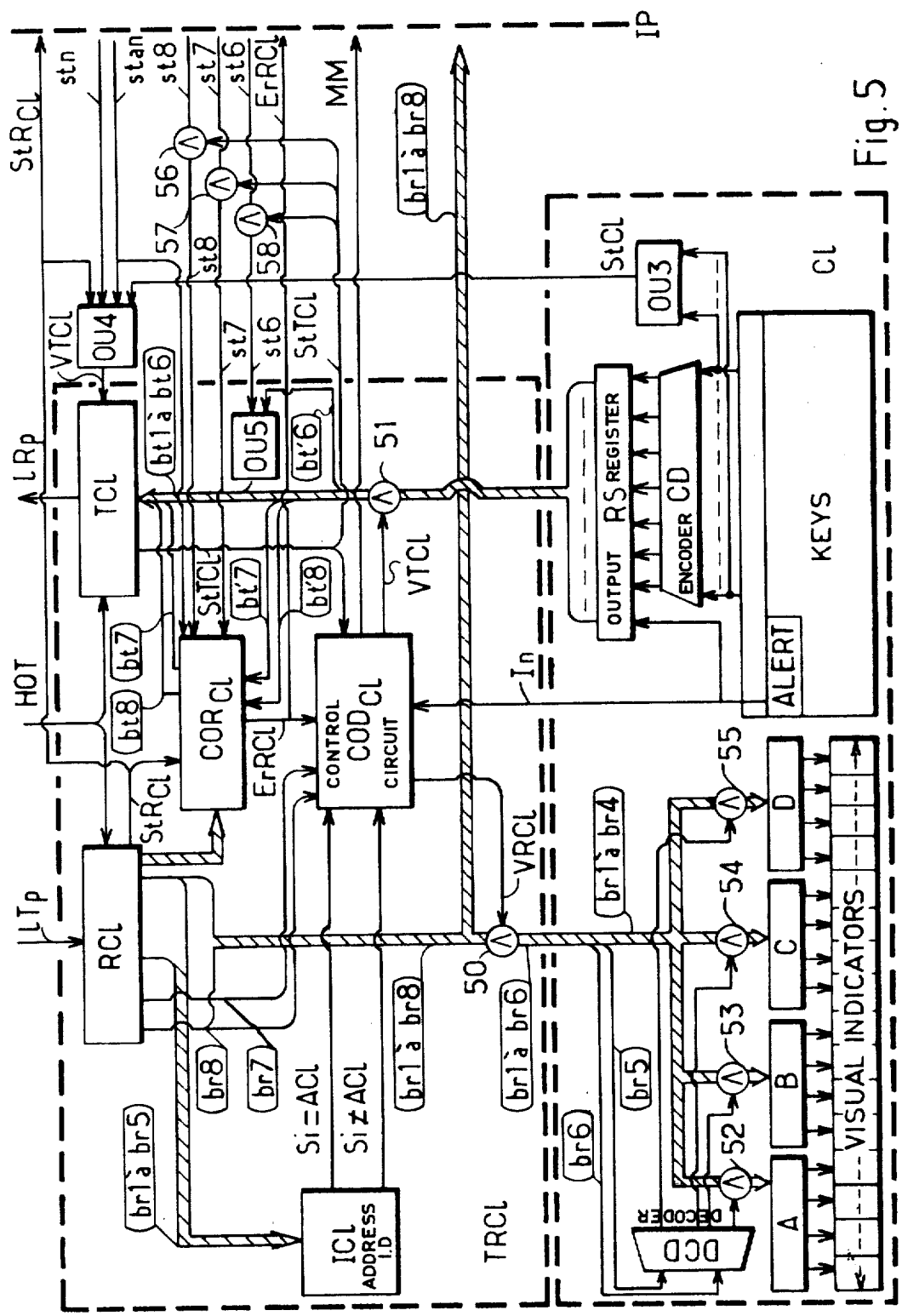
FIG. 5 is a block diagram of a portion of the transmitter/receiver circuit for connecting device Cl to the bus in FIG. 1 and for establishing a parallel connecting interface to another device which is not connected to the bus.

In FIG. 5 is shown an embodiment of a keyboard transmitter and receiver circuit TRCl, that includes keyboard Cl, a receiver RCl, a transmitter TCl and interface circuits similar to those described in connection with FIG. 3. Circuit TRCl is connected to unit UT by lines 1Tp and 1Rp of the bus of FIG. 1, somewhat similarly to the way circuits TRAE and TRAR are connected to the bus. Circuit TRCl is also connected by a parallel connecting interface IP to a peripheral device (not shown) which is not connected directly to the bus. The peripheral device is connected to unit UT via circuit TCl, interface IP and other circuitry illustrated in FIG. 5. The peripheral device may be an output device capable of being responsive to the eight bit parallel characters derived as bits $br1$-$br8$ from receiver circuit RCl. The peripheral device also supplies binary bits $st6$, $st7$ and $st8$, as well as binary signals $stn$ and $stan$ through interface Ip to transmitter circuit TCl via the interface circuitry illustrated in FIG. 5. Bits $st6$, $st7$ and $st8$ enable mode select, interrupt, error signals associated with cases $a$, $e$ and $f$ (FIG. 4) to be transmitted from the peripheral device to unit UT. In certain circumstances, as described infra in connection with FIGS. 9-13, a peripheral device may derive first characters to control whether that device or other devices are to be activated in the single or multiple mode. Signals $stn$ and $stan$ are derived from the peripheral device to indicate normal and abnormal changes, respectively, in the peripheral device.

Keyboard Cl includes a set of standard keys, e.g., alpha-numeric, space and line return keys, and an alert key. All of the standard keys are connected to an encoder CD which converts the information transmitted from each of the standard keys into a parallel bit character. The output of the alert key causes interruption signal In to be derived. Signal In is coupled to control circuit CODCl contained in circuit TRC1, and to an eight-stage output register RS included in keyboard Cl; register RS responds to the outputs of encoder CD to derive eight parallel output bits $bt'8, bt'7, bt6 \ldots bt1$ each time one of the standard keys is activated. Register RS is arranged so that if the alert key is activated, bits $bt'8$ and $bt'7$ respectively have values of 1 and 0 to indicate an interrupt. The standard keys also drive OR gate OU3 which derives an StCl output signal if one of the standard keys is pressed. Signal StCl is coupled as an enable input for transmitter circuit TCl through OR gate OU4, having an output signal VTCl.

If keyboard Cl is activated to the single mode by unit UT of FIG. 1, it is enabled as a character transmitter and receiver by signals VRCl and VTCl (generated by circuit CODCl). Signals VRCl and VTCl enable transfer circuits 50 and 51 which respectively feed eight bit parallel characters to circuit TCl and from circuit RCl. The eight parallel output bits of register RS are connected to circuit 51, whereby each eight parallel bit character derived from the standard keys of keyboard Cl is transferred to circuit TCl only when signal VTCl is present.

A set of visual indicators of keyboard Cl is controlled by the parallel outputs of four, four-bit registers A, B, C, D. Registers A, B, C, D, are loaded with the four bits $br1$ to $br4$ of each character which is derived from circuit RCl after a first selecting character of a message has been received by circuit RCl and processed by the circuitry responsive to cricuit RCl. Bits $br1$ to $br4$ are transmitted through circuit 50 when the latter is enabled by signal VRCl. Two other bits $br5$ and $br6$ are fed to decoder DCD of input-output device Cl by circuit 50. Decoder DCD responds to its two input bits to selectively derive one of four output signals, one of which is provided as an enabling signal for each of transfer circuits 52–55 that are driven in parallel by bits $br1$ to $br4$ fed through transfer circuit 50. Depending on which of the transfer circuits 52–55 is enabled, bits $br1$–$br4$ are loaded into a selected one of registers A, B, C, D which in turn drive a bank of visual indicators.

Keyboard Cl illustrated in FIG. 5 is an example of a transmitter device, such as device AE in FIG. 1, whereby circuits RCl, ICl, CODCl, CORCl, and TCl in FIG. 5 are identical to circuits RAE, IAE, CODE, CORE and TAE in FIG. 1. When circuit ICl identifies the first character as having the address ACl of the input-output device Cl of FIG. 5, it supplies signal Si=ACl to circuit CODCl; if the address of the first character differs from ACl, circuit ICl supplies signal Si≠ACl to circuit CODCl. Depending on the binary values of bits $br8$ and $br7$ emitted by circuit RCl during the first character, the selected input-output device Cl, is activated by circuit CODCl to the single or multiple mode. Signals StRCl, StTCl and ErRCl in FIG. 5 are respectively generated under the same conditions as signals StRE, StTE and ErRE in FIG. 1. Bits $bt'8$ and $bt'7$, which are transmitted by circuit 51 to circuit CORCl, are forced to predetermined bit values $bt8$ and $bt7$ at the output of circuit CORCl in FIG. 5.

In FIG. 4 is also shown interface IP for connecting keyboard Cl in parallel with another peripheral device (not shown), which is connected to the bus in FIG. 1 via the same interface as keyboard Cl. Signals $stn, stan, st6,$ $st7$ and $st8$ are fed from the peripheral device through interface IP and are ultimately coupled via circuit TRCl to circuit TCl, while signals $br1$–$br8$, MM, ErcL and StRCl are ultimately fed from circuit RCl via circuit TRCl through interface IP to the peripheral device. The eight output bits $br1$ to $br8$ of circuit RCl are connected directly to eight inputs of interface IP. Circuits RCl, CORCl and CODCl respectively supply signals StRCl, ErRCl, and MM (the latter selects the multiple mode) to interface IP. Signals $st8$ and $st7$ are respectively fed from interface IP to circuit CORCl via transfer circuits 56 and 57 which are enabled to parallel by signal StTCl. Signal $st6$ is fed from interface IP to an input of an OR gate OU5 via a transfer circuit 58 which is also enabled by signal StTCl. OR gate OU5 generates an output bit $bt6$ when either of signals $st6$ from the peripheral device, or $bt'6$ from register R5 of keyboard Cl has a binary 1 value; the $bt6$ output of gate OU5 is fed to a parallel character input of circuit TCl.

Interface IP feeds signals $stn$ and $stan$ to inputs of gate OU4; signal $stan$ is also fed to an input of circuit CORCl. Gate OU4 is also responsive to output signal StRCl of circuit RCl, whereby signal VTCl is generated at the output of gate OU4 when one of the four signals StRCl, $stn, stan$ or StCl is derived. Signal VTC1, which enables keyboard Cl for transmission of a character along line 1Rp, is thus generated if (1) a character has been received by circuit RC1 from line ITp, (2) keyboard C1 is ready to transmit information, or (3) there is a normal or abnormal change of status on the part of the peripheral device connected to interface IP, as indicated by signals $stn$ and $stan$.

In a preferred application of the invention, a ticket printer is the external device connected to circuit TRC1 by interface IP. In the multiple mode, information from keyboard C1 may be fed to the ticked printer via the bus channel and the parallel interface. In another embodiment, a display screen may also be connected to keyboard C1 by the parallel interface to enable alphanumeric data to be displayed when keyboard C1 is selected in the multiple mode (i.e., when the indicators of keyboard C1 are disabled).

Figure 6:
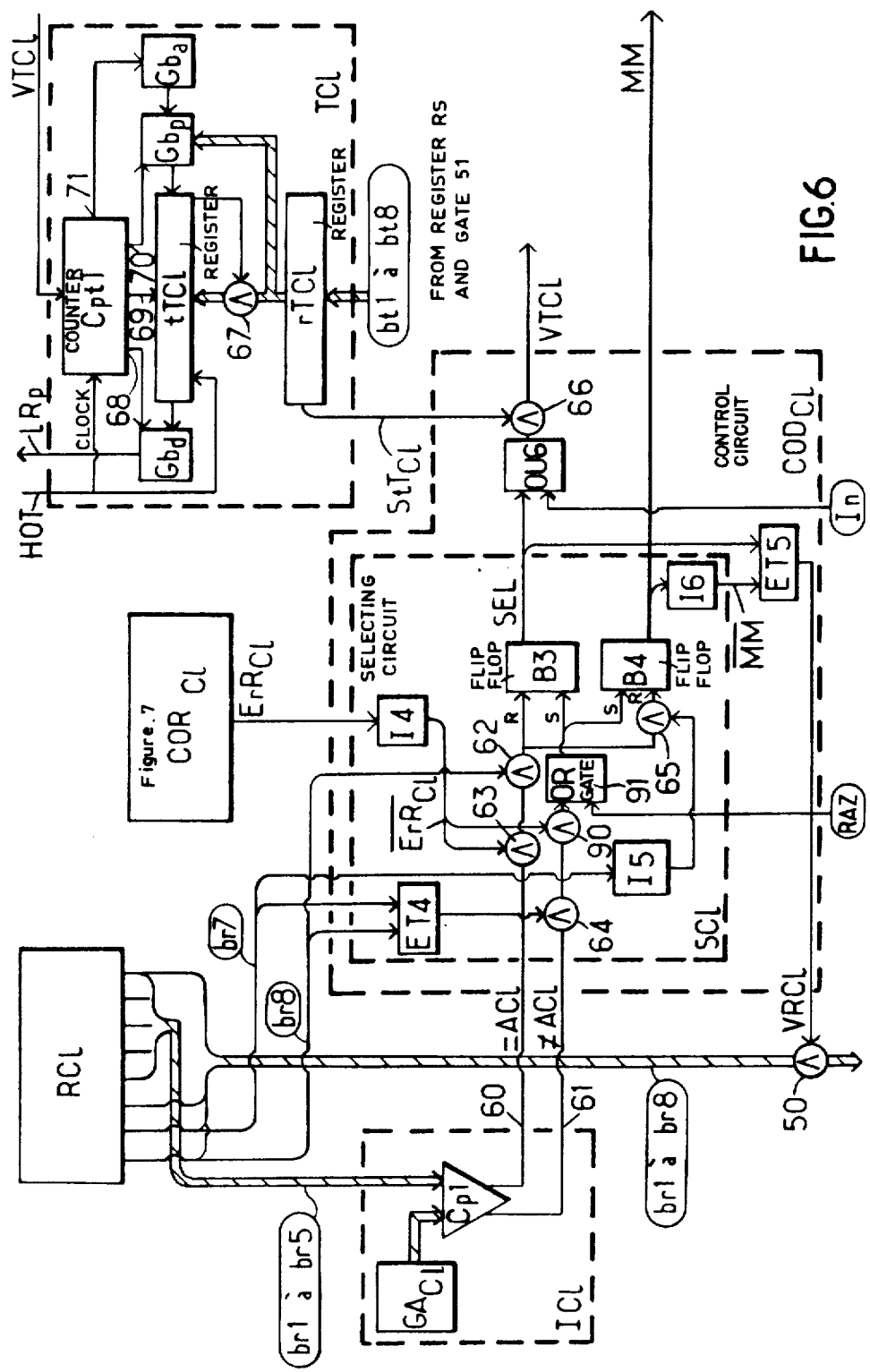
FIG. 6 is a block diagram of a selecting circuit contained in the circuit of FIG. 5.

In FIG. 6 are illustrated details of circuits SC1, IC1, and TC1 of FIG. 5, as well as connections to these circuits. The details of circuits IC1, SC1 and TC1 respectively correspond with the details of circuits IAE, IAR, SAE and TAE of FIGS. 1 and 3.

The details of selecting circuit SC1, contained in the control circuit CODC1, are identical to those of circuit SAR, FIG. 3, in that circuits ET4, I4, I5, B3, B4, I6, 62, 63, 64, 65, 90 and 91 of the former respectively correspond with circuits ET3, I1, I2, B1, B2, I6, 31, 30, 32, 33, 36 and 37 of the latter. Circuit SC1 responds to the $br7$ and $br8$ outputs of circuit RC1, the =AC1 and ≠AC1 outputs of circuit IC1, the ErCl output of circuit CORCl and a zero resetting signal RAZ from the keyboard to derive signals SEL and $\overline{MM}$ in the same manner circuit SAR responds to signals $br7, br8,$ =AAR, ≠AAR and RAZ. Thereby, no further description of circuit SCl is believed necessary.

The SEL and $\overline{MM}$ outputs of circuit SCl are combined in gate ET5, having the same function as that of gate ET1 in FIG. 1, to derive signal VRCl that enables gate 50 to pass bits $br1$ - $br8$ from circuit RCl to circuits 52 - 55 and decoder DCD of FIG. 5; signal VRCl is derived when circuit TRCl is responsive to a first character indicating that the single mode is selected.

Signal VTC1, which is derived when keyboard C1 is activated in either the single or multiple mode, is generated at the output of OR gate OU6 when the latter receives signal SEL from flip-flop B3 or interrupt signal In from keyboard C1. Signal VTC1 is derived from AND gate 66 (which is enabled by signal StTC1) as an enabling signal to transfer circuit 51 to cause signal coupling from register RS to circuit TC1, FIG. 5, each time a signal has been fed from register RS to circuit TC1.

Circuit IC1 includes register GAC1, which derives the five parallel bits for the coded address of device C1, and a comparator Cp1 which is connected to the five bit output of generator GAC1 and five parallel output bits $br1 - br5$ of circuit RC1 which indicate the coded address to be identified. Signals $=AC1$ and $\neq AC1$ at two complementary output terminals 60 and 61 of comparator Cp1 respectively represent an address coded on bits $br1$ to $br5$ having been identified as the same as, or different from, address AC1.

Circuit TC1 includes a first eight bit register $rTC1$ responsive to the eight parallel bits $bt1$ to $bt8$, as coupled through circuit 51 from register RS, FIG. 5. Signal $StTC1$ is derived from an output of register $rTC1$ each time the register is loaded. Eight bit, parallel-input to serial-output register $tTC1$ in circuit TC1 responds to the parallel outputs of register $rTC1$ via transfer circuit 67. Register TC1 also includes a serial input responsive to parity bit generator Gbp. Register $tTC1$ enables circuit 67 when the register is empty, i.e., when its contents have been completely shifted to its serial output.

Circuit TC1 also includes a counter CptT which is set to an initial state by signal VTC1 and which is driven between adjacent counts by clock signals received from line HOT. Counter CptT includes internal circuitry, appropriate to the format of a character shown in FIG. 4, to derive signals on its outputs 68, 69, 70 and 71. Signals from outputs 68, 69, 70 and 71 respectively activate a start bit generator Gbd, register $tTC1$, parity bit generator Gbp, and a stop-bit generator Gba. Circuits Gba, Gbp, $tTC1$ and Gbd are connected to one another in series, whereby the bits generated in these circuits are sequentially transferred from circuits Gba to circuit Gbp, to circuit $tTC1$, and to circuit Gbd in response to control signals from outputs 68, 69, 70, 71. The signals from circuits Gbd, $tTC1$, Gbp and Gba are sequentially transmitted, in the order indicated by the format shown in FIG. 4, along the line lRp which is connected to the output of generator GBd. Parity bit $bp$, FIG. 4 is derived by generator Gbp, having eight parallel inputs respectively responsive to the outputs of eight bit register $rTC1$.

Figure 7:
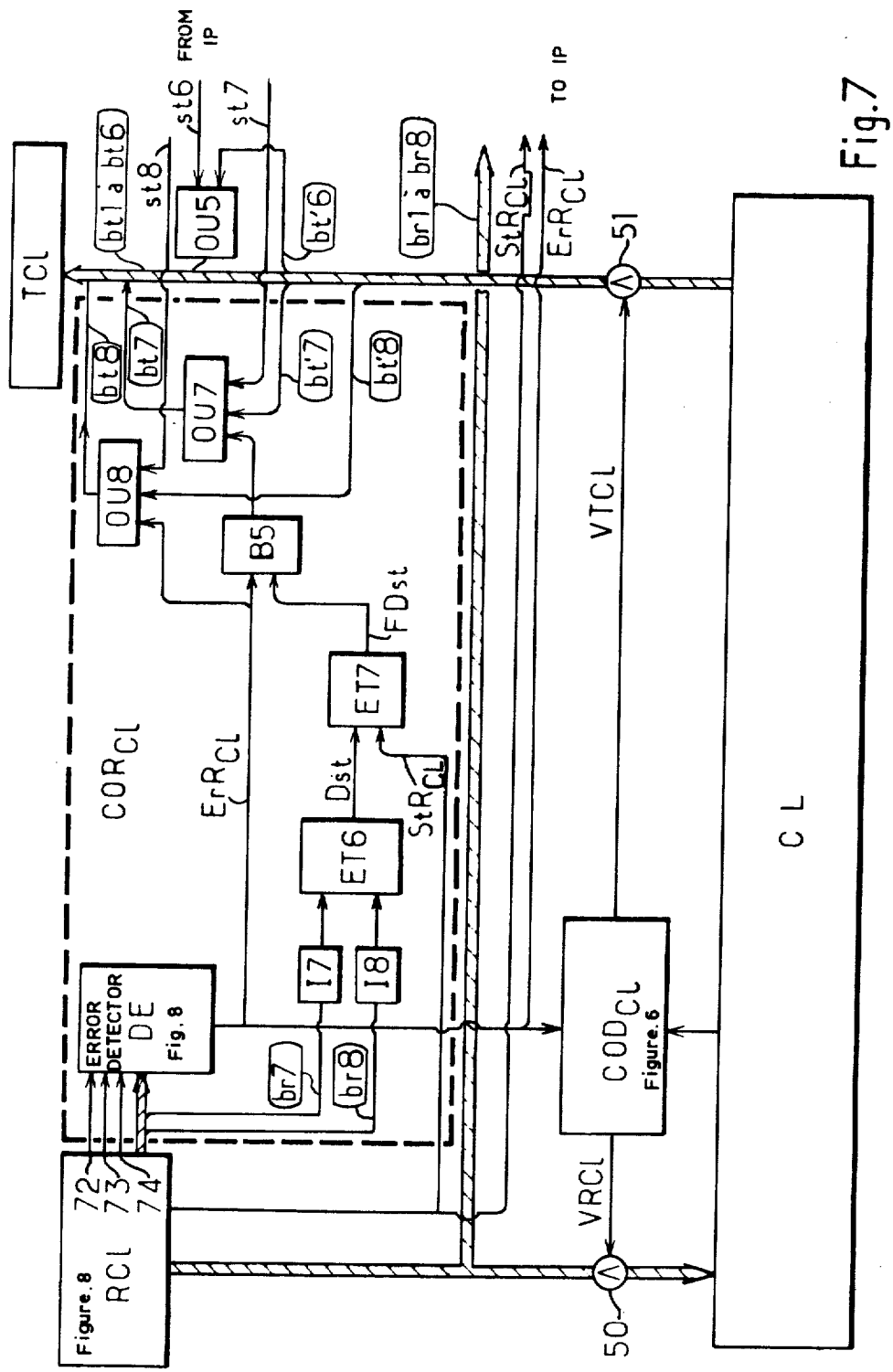
FIG. 7 is a block diagram of a circuit for monitoring the reception of characters from the bus of FIG. 1, which is contained in the circuit of FIG. 5.

Details of checking circuit CORC1 for deriving bits $bt8$ and $bt7$ are illustrated in FIG. 7. Bit $bt8$ has a binary one value for cases $e$ and $f$ indicated in FIG. 4, i.e., in response to an error being detected in the signal received by circuit RC1 on line 1Tp or an interrupt sequence being derived from keyboard C1 or the peripheral device connected to circuit TRC1 via interface IP, as signalled by $bt'8 = 1$ or $st8 = 1$; bit $bt8$ may also have a binary one value for indeterminate (case $g$, FIG. 4). Circuit CORC1 contains an error detector DE (illustrated in detail in FIG. 8) which is responsive to control signals at terminals 72, 73 and 74 of circuit RC1 (illustrated in detail in FIG. 8) which also feeds the eight parallel bits $br1$ to $br8$ to circuit CORC1. In the event of an error in the character received from line lTP, detector DE derives signal ErRC1, which is fed in parallel to circuit CODC1, an input of interface IP, one input of flip-flop B5 in circuit CORC1 (to drive the flip-flop into a first state) and an input of an OR gate OU8. Gate OU8 also responds to interrupt indicating signal $st8$ from interface IP (FIG. 5) and interrupt indicating bit $bt'8$, that is coupled to circuit TC1 when one of the signals ErRC1, $st8$ and $bt'8$ has a binary one value.

Circuit CORC1 includes OR gate OU7 that is responsive to bit $bt'7$ and $st7$ as respectively derived from keyboard C1 and the peripheral device, as well as an error indicating output signal of flip-flop B5, that is controlled by signals of circuit CORC1 that are derived from circuit RC1. Circuit RC1 drives AND gate ET6 with $\overline{br7}$ and $\overline{br8}$ outputs of inverters I7 and I8, which are in turn responsive to bits $br7$ and $br8$, as derived from circuit RC1. In response to bits $br8$ and $br7$, both having 0 values, which represents a status request being made by unit UT (case $b$, FIG. 4), gate ET6 derives signal Dst, which is fed to an input of an AND gate ET7, having another input responsive to output signal StRC1 of circuit RC1. When signals Dst and StRC1 are coupled to the inputs of gate ET7, the gate derives signal FDst. Signal D$st$ may also be the result of a check on bits $br1$ to $br6$ which confirms that they do conform to case (b) in FIG. 4, a result that can be attained by feeding bits $br1 - br6$ from circuit RC1 to a logic network (not shown) having connections determined by case ($b$); the output of such a logic network can be combined in an OR gate (not shown) that is also responsive to the output of AND gate ET2, or the logic network can derive signal D$st$. Flip-flop B5, while driven to the first state in response to error indicating signal ErRC1 at its first input, generates a binary one output signal which is supplied to an input of OR gate OU7. Flip-flop B5 is activated to its second state to derive a binary zero output signal in response to signal FDst which represents the end of the status request made by unit UT. An error (which forces bit $bt7$ to 1), be it a transmission error on the part of line 1Tp, or one signalled by device C1, or one signalled by the other device connected by interface IP, ceases to be signalled to unit UT by circuit TC1 as soon as signal FDst is derived.

Figure 8:
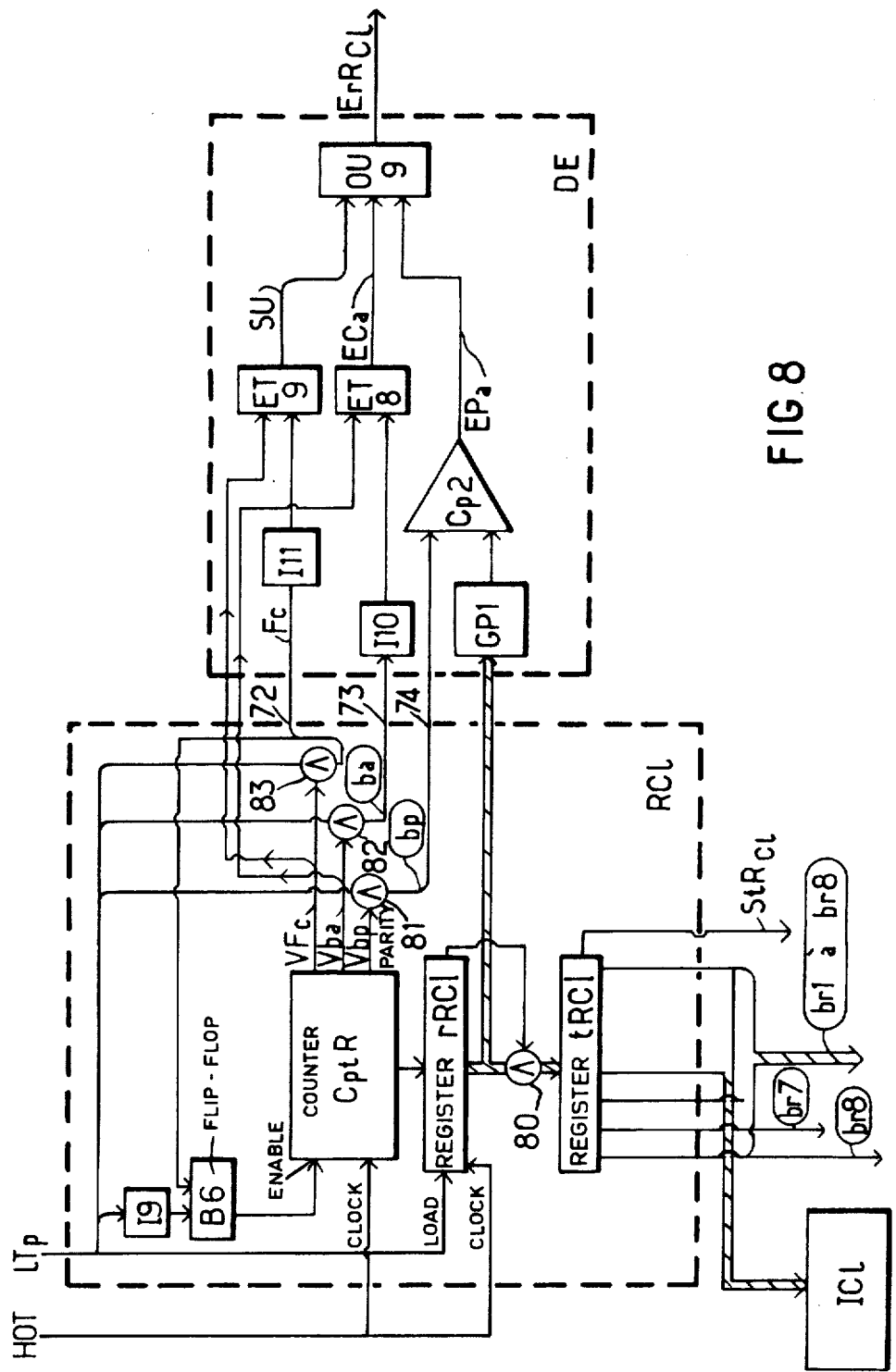
FIG. 8 is a block diagram of circuitry for receiving characters from the bus of FIG. 1 and for detecting reception errors, which circuitry is contained in the circuit of FIG. 5.

In FIG. 8 are illustrated the details of circuit RC1 of FIGS. 5, 6 and 7 and detector DE. Circuit RC1 contains two eight-bit registers rRC1 and tRC1. Register rRC1 is loaded with bits $bt1 - bt8$ via a series input connected to line 1Tp under the control of signal HOT so that the register is loaded from line 1Tp at a rate which is selected by unit UT. After bits $bt1 - bt8$ have been loaded into register rRC1, the register is read out via eight parallel outputs which are fed to register $tRc1$ by a transfer circuit 80, which is enabled by a control output of register $rRC1$ as soon as the register has been fully loaded from line 1Tp. Register $tRC1$ derives eight parallel output bits $br1$ to $br8$ and output signal StRC1 which indicates the register is loaded and thus ready to be read out.

In a way which suits the character format shown in FIG. 4, a counter CptR, contained in circuit RC1, selects the various bits of each character received from line 1Tp. Counter CptR is enabled in response to a change of level, from high level NH to low level NB, occurring at the end of line 1Tp to indicate the arrival of first, i.e., start, bit $bd$ of a character at circuit RC1. Counter CptR is enabled by a binary one output signal of flip-flop B6 which it derives in response to a positive going transition at the output of inverter I9. The positive going transition is derived by inverter I9 in response to the positive to negative transition on line 1Tp when the line goes from NH to NB. Once enabled by flip-flop B6, counter CptR generates four sequential output signals in synchronism with clock signals on line HOT which drives a shift input of the counter. The output signals of counter CptR are derived in accordance with a sequence appropriate to the format of characters shown in FIG. 4.

In response to the eight HOT bits following the NH to NL transition, counter CptR derives a first output signal having binary one value during bits br1 - br8; the first output is fed to an enabling input of register rRC1 whereby bits br1 to br8 are loaded into the register. In response to the next HOT bit, counter CptR derives a second output signal Vbp to enable AND gate 82 to pass stop bit ba from line 1Tp to a second input of detector DE. A fourth output signal VFc from counter CptR is derived in response to the next HOT bit to enable AND gate 83 so that a high level NH, representing the end of the character, is coupled from line 1Tp to a third input of detector Dt.

As shown in FIG. 8, detector DE contains a parity error detector including parity bit generator GP1, having eight parallel inputs responsive to output bits br1 to br8 of register rRC1, and comparator Cp2 having one input responsive to the parity bit bp coupled through gate 81 and another input responsive to the output of generator GP1. Comparator Cp2 generates a parity error signal EPa when the parity bit which generator GP1 has determined from bits br1 to br8 differs from bit bp of a character transmitted along line 1Tp. Circuit DE also contains a coding error detector, formed by AND gate ET8 and inverter I10, which is responsive to bit ba, as passed through gate 82. A second input of gate ET8 is responsive to the Vba output of counter CptR so that if a binary one signal is derived from inverter I10 (meaning that received bit ba has a binary zero value) when a signal Vba is derived from counter CptR, a coding error signal ECa is generated from the output of gate ET8.

Detector DE also contains a detector for detecting overflow, (i.e., two characters transmitted by line 1Tp overlapping). The overflow detector includes AND gate ET9 which is responsive to both the VFc output of counter CptR, and an output of inverter I11 which in turn responds to the Fc output of gate 83; inverter I11 thereby derives a binary one signal when there is no end of character signal Fc. An overflow signal Su is derived at the output of gate ET9 when signals VFc and the output of inverter I11 both have binary one values. OR gate OU9 generates the ErRC1 signal of FIGS. 5, 6 and 7 when one of the three signals EPa, ECa and Su is present at one of its three inputs.

Figure 9A:
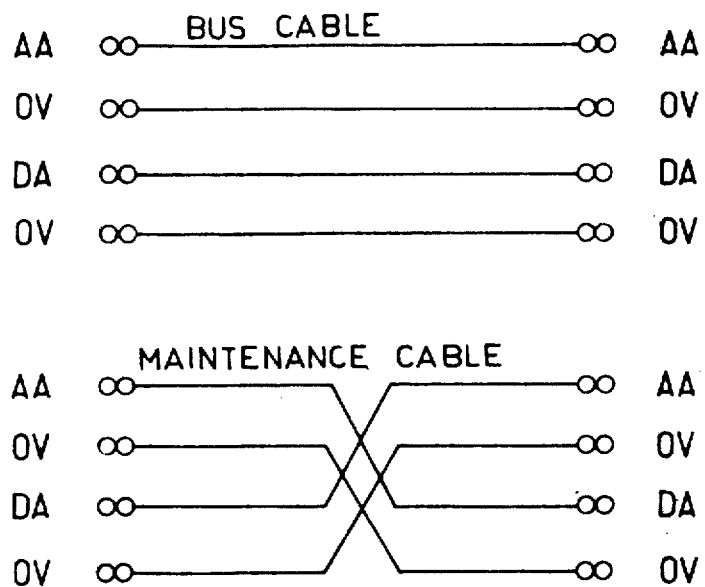
FIG. 9a is an illustration of a bus cable and a maintenance cable for interconnecting the transmitting and receiving circuits of two devices in accordance with the invention.

In FIG. 9a is shown a bus cable and a maintenance cable by which the transmitting and receiving circuits of two devices at one station may be connected together. The bus cable contains two wires respectively designated AA-AA and DA-DA, which respectively represent lines similar to lines 1Tp and 1Rp of FIGS. 1, 3, 5. The bus cable in FIG. 9a also contains two other wires, both having a potential of 0 volts, which respectively are associated with wires AA—AA and DA—DA. Wires AA and DD respectively signify "to a device" and "from a device". The maintenance cable in FIG. 9a contains two crossed wires AA-DA and DA-AA to link the transmitting circuit of a device directly to the receiver circuit of another device at the same station. Two other wires, both at a potential of 0 volts, cross over in the same way as wires and AA-DA and DA-AA, with which they are respectively associated.

Figure 9B:
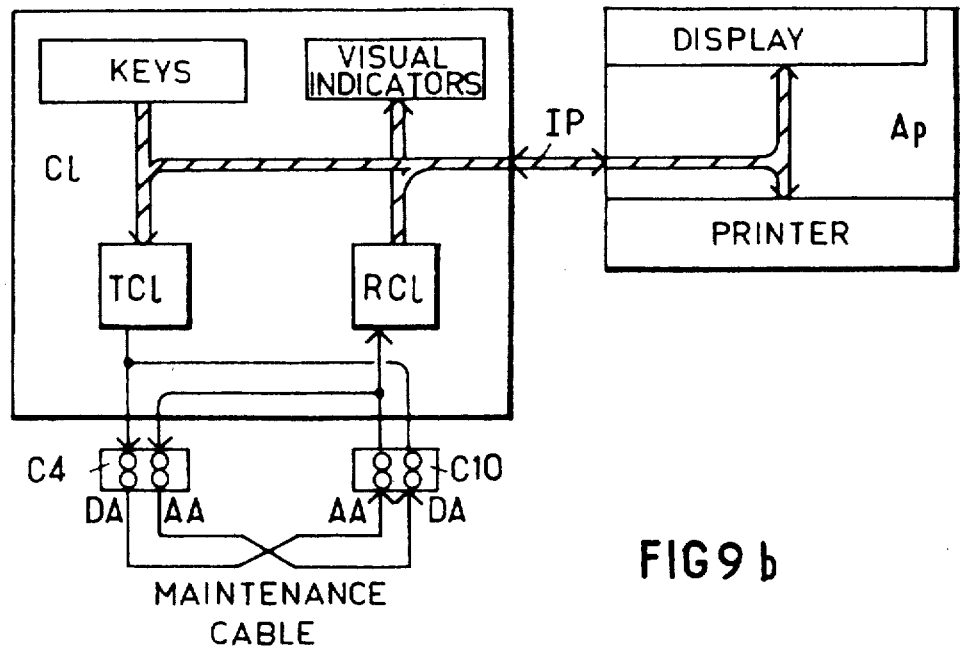
FIG. 9b is an illustration of connections between the receiver circuit and transmitter circuit of a device Cl which is made via a maintenance cable as in FIG. 9a, for monitoring another device which is connected to device Cl by a parallel interface as in FIG. 5.

FIG. 9b is a diagram indicating how the invention of FIGS. 1 to 8 can be used to check the keys and indicators of device C1 which are interconnected by circuits TC1 and RC1 and the maintenance cable shown in FIG. 9a. Circuit TC1 is connected to input AA of DA connector C10, which in turn is connected to output DA of connector C4 by wires DA-AA in the maintenance cable of FIG. 9a. Information is also transmitted from the output AA of connector C4 to the input DA of connector C1 by wire AA-DA of the maintenance cable.

Thus, by pressing the keys of device C1, the device performs a self-checking operation by displaying on the indicators the keyed data; device C1 is activated to the single mode by appropriately energizing its keys.

The various stages of the self-checking operation are shown in FIG. 10. Device C1 is deactivated from the single mode and activated to the multiple mode whereby a parallel connection is established between device Ap and device C1, FIG. 9b via the interface IP, FIG. 5. In the single mode, device C1 is both a data transmitter and a data receiver, whereby information from the keys is transmitted by circuit TC1, the maintenance cable and circuit RC1 to the indicators of the device, as well as to a display at device Ap. In the multiple mode, device C1 is purely a data transmitter and the information from the keys thereof is transmitted to device Ap in FIG. 9b by circuit TC1, the maintenance cable, circuit RC1, and interface IP.

After device C1 has first been activated to the single mode for self checking and if the device has been found to be operating properly, it can also be used to check device Ap by following the various steps shown in FIG. 11. Since Circuits TC1 and RC1 are connected to each other by the maintenance cable and to device Ap by a cable containing wires equal in number to the inputs and outputs of interface IP, device C1 is first activated to the multiple mode. This selection is made by activating the keys of device C1 so that bits bt1 to bt6 contain the address of device C1 and bit bt'7 has a binary zero value; further the alert key is pressed, whereby bit bt'8 has a binary one value. In this way, register RS of FIG. 5 is loaded with a first character for activating device C1 to the multiple mode.

This first character, when received by circuit RC1, activates device C1 so it is only a transmitter by means of its bits br8 and br7, which are at 1 and 0, respectively. The first character thus prevents additional characters received by circuit RCL to be transferred to the visual indicator of device C1. A second character transmitted from the keys of device C1 activates the display of device Ap. The second character, which is emitted by circuit RC1 and transmitted via interface IP, has values of 1 and 0 for bits br8 and br7, respectively, and the address of the display of device Ap. The data from the keys of device C1 are displayed by the display of device Ap, thus enabling the condition of the parallel link to be checked. If the link is in good condition, the printer of device Ap is activated to the multiple mode by activating the keys of device C1 so a new character is derived. The new character, which is transmitted by circuit RC1 respectively has values of 1 and 0 for bits br8 and br7 and the address of the printer of device Ap.

In a preferred embodiment relating to this application of the invention, the display of device Ap is selected by the same first character that activates device C1 to the multiple mode. The second multiple mode first character selects the printer of device Ap and allow the display to remain selected; this result occurs because the first character contains the same address for selecting the display as is used to select device Cl. Characters derived from keys of device Cl are transmitted by the maintenance cable and the parallel link cable to the printer and the display of device Ap. A comparison between the characters received by the display and the printer enables the printer to be checked against the display of the device. The comparison may be performed by an operator visually inspecting the display and printer, and seeing if the information is identical to what was keyed into device Cl. If the printer is operating satisfactorily, device Cl is activated to the single mode by transmitting from its keys a first character containing bits $bt'8$ and $bt'7$ at 1 and the address of device Cl. Device Ap is deactivated in the normal way when it receives an address different from its own address in the single mode. The characters fed in from the keys of device Cl are received solely by the visual indicator of device Cl if the printer is effectively deactivated.

Figure 13:
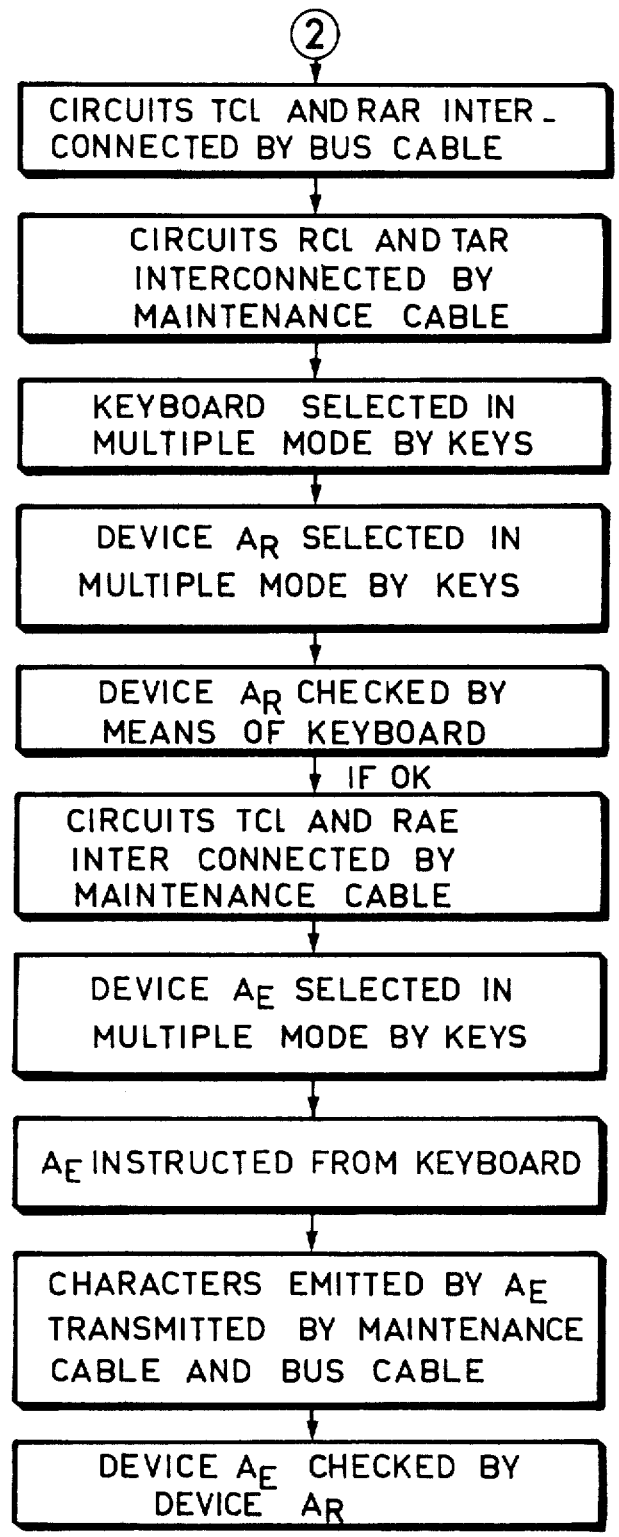

In FIG. 12a is shown another example of an application of the invention of FIGS. 1 to 8, where use is made of the maintenance and bus cables of FIG. 9a. Circuits RCl and TCl (FIG. 5) of device Cl are respectively connected to the circuits TAR and RAR (FIG. 1) of a device AR, after device Cl has been activated to check itself as described in connection with FIGS. 9b and 10. The operations associated with the operation of FIG. 12a are illustrated in FIG. 13; equivalent diagrams for different operation of the system of FIG. 12a are illustrated in FIGS. 12b and 12c. In FIG. 12a, circuits RCl, TCl, RAR, TAR are interconnected by a bus cable and a maintenance cable in a first state ① shown in the equivalent diagram in FIG. 12b. As indicated in FIG. 13, circuits TCl and RAR are first interconnected by a bus cable, having opposite ends coupled to connector C4 (FIGS. 9b and 12a) and to a connector C2. Circuits TAR and RCl are interconnected (in state ①) by the maintenance cable, the opposite ends of which are coupled to connector C3 and connector C1 (FIGS. 9b and 12a). A first character, which is transmitted by circuit TCl via connectors C4, C2, C3, Cl is received by circuit RCl so that the first character activates device Cl to the multiple mode by the means already described; bits $br8$ and $br7$ of this first character being respectively 1 and 0 and bits $br1$ to $br5$ indicating the address of device Cl. A second character, transmitted by circuit TCl via connectors C4 and C2, is received by circuit RAR to activate device AR to the multiple mode by the means already described; this second character has values of 1 and 0 respectively for bits $br8$ and $br7$ and the address of device AR indicated by bits $br1$ to $br5$. After device Cl and device AR have been respectively activated as data transmitter and receiver, characters are derived from the keys of device Cl. The characters received by device AR are compared with the characters derived from device Cl, which enables an operator to check the functioning of device AR.

If apparatus AR is functioning correctly, the maintenance cable is changed to a second state ②. In state ②, one end of the maintenance cable remains connected to device Cl via connector Cl (FIGS. 9b and 12a) and the other end of the cable is connected to device AE by connector C5. As indicated in FIG. 13, circuits RAE and TCl are interconnected by the maintenance cable (in state ②). Device AE is activated to the multiple mode by device Cl in response to bits $br8$ and $br7$ of a first character, derived from circuit TCl being 1 and 0, respectively, and the address of device AE indicated by bits $br1$ and $br5$. The same wire DA-AA in the maintenance cable which connects connector Cl to connector C5 and circuit TCl to circuit RAE, provides a link from the device Cl to device AE for a command for the latter to emit characters. Since device Cl is still connected to device AR by the bus cable connected to connectors C4 and C2 of FIG. 12a, circuits RAE, TAE, RCl, RAR, TAR are interconnected as shown in the equivalent diagram in FIG. 12c. Characters which are derived from circuit TAE of device AE, which has been selected as a transmitter, are transmitted to circuit RAR of device AR via connector C5, wire DA-AA in the maintenance cable (which is in state ②), connectors Cl and C4 in succession, and connector C2. By comparing the characters derived from device AE with the characters received by device AR, an operator is able to check the functioning of device AE.

In FIGS. 9a, 9b, 10, 11, 12a, 12b, 12c and 13 are shown examples of the application of the interface improvement according to the invention which is dealt with in FIGS. 1, 2, 3, 4, 5, 6, 7, and 8. The description of the transmitting and receiving circuits of the devices has shown in particular, that the devices can be connected together directly (without an intervening data processing unit) so that an exchange of data can take place between two devices along two lines of a bus cable and a maintenance cable in a so-called multiple dialoguing mode according to the invention. This exchange of data is particularly useful for maintaining the devices and to determine if they are ready to dialogue under reliable conditions, with a processing unit.

The structure of a transmitter/receiver circuit according to the invention, such as the circuit of device Cl in FIGS. 5, 6, 7 and 8, is particularly useful because it enables a peripheral device which is locally connected in parallel with device Cl to dialogue with a data processing unit which is remotely connected to device Cl by the bus cable. The invention also has great usefulness when it is necessary for there to be a keyboard in a working station connected to a computer.

Another advantage of the present invention, when a unit is dialoguing with the devices at a working station, is that there is a reduction in the cost of the interface as a result of the small number of interface circuits (in comparison with those in a star connection for example) and the reduced size of the program in memory of the unit which is intended for input/output management. These advantages occur because a single dialoguing sequence may be initiated with two devices by using a single dialogue initiating routine.

While there have been described and illustrated several specific embodiments of the invention, it will be clear that variations in the details of the embodiments specifically illustrated and described may be made without departing from the true spirit and scope of the invention as defined in the appended claims.

We claim:
1. An interface for connecting a data processing unit to data transmitting and receiving devices; the interface including a transmitter/receiver circuit connected to the unit and transmitter/receiver circuit means associated with the devices; the unit transmitter/receiver circuit being connected to transmitter/receiver circuit means for the devices by two signal transmission lines in a channel which exchanges data between the unit and the devices, character by character, by sequentially transmitting bits of each character; a dialoguing sequence between the unit and one of the devices being initiated by a first character containing an address associated with the one device; first first characters indicating single mode operation whereby the unit and only one of the devices are interconnected to exchange data, second first characters indicating multiple mode operation whereby two of the devices are interconnected via the lines and the unit, the single mode being identified by first characters having first and second bits in a predetermined first logic state, the single mode first characters including additional bits for indicating an address of the one device; the multiple mode being identified by first characters having the first and second bits in a predetermined second logic state, first and second first characters being derived during only one sequence when there is multiple mode operation, the first and second first characters having addresses for different ones of the devices; comprising station transmitter/receiver means including a first data terminal connected to one of the lines for sequentially receiving bits transmitted by the unit via the one line, a second data terminal connected to the other line for sequentially feeding bits to be transmitted by the interface to the unit via the other line, means for establishing a transmitting and receiving dialogue between the unit and only the one addressed device in response to the first character indicating single mode operation and for establishing a transmitting and receiving dialogue during only one sequence with the addressed devices indicated by the first and second first characters in response to the first and second first characters indicating multiple mode operation; said means for establishing including: means responsive to the sequential bits of each first character received at the first data terminal for identifying the address of the first character as being the address of the one device, and for identifying the mode indicated by the two bits of the first character; the circuit for each device further including: means responsive to the identified first and second bits being for the single mode for enabling the one device associated with the identified address to be a data transmitter and receiver; the circuits associated with each of the two devices selected for multiple mode operation including means responsive to the identified first and second bits being for the multiple mode for enabling the device associated with the circuit at one of the two identified addresses to dialogue with the unit during the same sequence, one of the two devices being activated as a data transmitter and the other of the two devices being activated as a data receiver in the multiple mode; the station transmitter/receiver means including means for feeding to the second data terminal sequential bits derived in the interface in response to signals derived by a device connected to the interface.

2. The interface of claim 1 wherein the means for establishing includes means responsive to the first character indicating single mode operation and an address different from the address of the one device for disabling the transmitting and receiving dialogue between the one device and unit, and means responsive to the first character indicating mutliple mode operation and an address different from the address of the one device for enabling an establishing dialogue with the one device to be maintained.

3. The interface of claim 2, wherein each device transmitter/receiver circuit includes a receiver circuit and a transmitter circuit, the receiver circuit including means for receiving the bits of each character transmitted along one of the lines in series and for converting the received series bits into parallel multi-bit output characters that are supplied to the device in sequence, the transmitter circuit including means responsive to parallel multi-bit output characters sequentially derived from the device for converting the device output characters into sequential bits that are supplied to the other line, each character containing first and second bits for signalling the presence of a selecting character and the operating mode, and a combination of bits representing the address of the device, the selecting means contained in each device transmitter/receiver circuit including: (a) address identifying circuit for generating first and second outputs in response to first and second bit combinations representing the address of the device and the address of another device being respectively coupled to inputs of the selecting means by outputs of the receiver circuit; (b) a control circuit including a selecting circuit for generating first and second output signals respectively representing selection and single mode operations, said control circuit deriving said output signals in response to (i) the first output of the identifying circuit and (ii) the first bit having a first binary value, and (iii) the second bit having the first binary value to signal the single mode, and (c) a first AND gate responsive to the two outputs of the selecting circuit for deriving a single mode selecting signal in response to the occurrence of the first and second output signals of the selecting circuit.

4. The interface of claim 3 wherein first and second devices are connected to a single station transmitter/receiver means, selecting means of the single station transmitter/receiver means including two first transfer circuits for respectively connecting the first device to a transmitter circuit of the single circuit means and a receiver circuit of the single means to the second device, means for enabling the transfer circuits in response to the first output signal of control circuits contained in the means for selecting the first and second devices, whereby in response to the first signals being derived from both control circuits, the first and second devices are respectively activated in both the single and multiple modes in response to two first characters of the same sequence which contain the first bit in the first logic state and the addresses of the two devices.

5. The interface of claim 4 wherein said means for selecting the first and second devices includes two second transfer circuits for respectively connecting the receiver circuit for the first device to the first device and the second device to the transmitter circuit for the second device, said transfer devices being enabled by the second output signals of the control circuits of the means for selecting the first and second devices, whereby in response to the scond output signals being derived by both control circuits the first and second devices are only respectively activated as a data transmitter and receiver in the single mode in response to two first characters of the same sequence which contain the first and second bits in the first logic state and the addresses of the two devices.

6. The interface of claim 5 wherein the selecting circuit of the control circuit includes means to cease generating the first output signal while the second output is derived from the identification circuit connected to another input of the selecting circuit and while the identified device is activated by the first output signal of the control circuit of the means for selecting the device and while the first and second bits both have first binary values, whereby the device is no longer activated when signals for selection and single mode selection are not derived as the first and second output signals of the control circuit as a result of the presence of a first character for activating another device to single mode at an output of the receiver circuit of said one device.

7. The interface of claim 6 wherein the selecting circuit in the means for selecting each device includes means to cease generating a selecting signal as the first output signal in response to a zero resetting signal derived from the device being coupled to another input of the selecting means, whereby the device is automatically deactivated in response to the selecting circuit being set to an initial state by the zero resetting signal.

8. The interface of claim 7 wherein the selecting circuit contained in the means for selecting each device includes first and second flip-flops having first and second inputs respectively responsive to the first and second outputs of the identification circuit in said selecting means, the first and second inputs of the first and second flip-flops also being respectively responsive to an output signal of the first flip-flop, said first flip-flop being set to a first state by a signal at its first input and deriving its output signal while in the first state, means for activating the device to the single mode in response to an output signal of the second flip-flop, said second flip-flop being set to a first state by a signal at its first input and deriving its output signal while in the first state.

9. The interface of claim 8 wherein said selecting circuit also includes a first logic circuit for feeding the first output of the identification circuit to the first inputs of the first and second flip-flops, said first logic circuit being enabled in response to the first bit having the first binary value at an output of the device receiver circuit, whereby the first and second flip-flops are set to a first state only when there is present at the output of the receiver circuit a first character that selects the device and which has its first bit at the first logic value.

10. The interface of claim 9 wherein the selecting circuit also includes a second logic circuit for coupling the second output of the identification circuit to the second inputs of the first and second flip-flops, and a second AND gate responsive to the first and second bits as derived from the receiver circuit for deriving an enabling signal for the second logic circuit in response to the first and second bits having the first binary value, whereby first and second flip-flops are only set to a second state by a first character that activates another device in the single mode, said first character being identified by its second bit having the first binary value.

11. The interface of claim 10 wherein the selecting circuit includes a third logic circuit for coupling the output of the first logic circuit to the first input of the second flip-flop, means for enabling the thrid logic circuit in response to the second bit having the second binary value at an output of the receiver circuit, whereby the second flip-flop is set to a first state only when there is present at the output of the receiver circuit a first character that activates the device in the multiple mode, said first character being identified by its second bit having the second binary value.

12. The interface of claim 11 wherein the selecting circuit includes an inverter responsive to the output of the second flip-flop and having an output coupled to an input of the first AND gate in the control circuit, whereby a signal is fed by the inverter to the first AND gate only when there is present at the output of the receiver circuit a first character that activates the device in the single mode, said first character being identified by its second bit having the first binary value.

13. The interface of claim 12 wherein the selecting circuit includes a first OR gate having first and second inputs respectively responsive to the second output of the identification circuit and a zero-reset signal output of the device and an output driving both second inputs of the first and second flip-flops, whereby the first and second flip-flops are set to the second state by the output of the first OR gate when the device is initiated or as a result of another device being selected in the single mode.

14. The interface of claim 13 wherein the device transmitter/receiver circuit includes a circuit for checking each character received from the station transmitter/receiver circuit by the receiver circuit of the device, said checking circuit including means for deriving an error signal from a first output in response to an error being detected in a parallel output character of the receiver circuit for the device.

15. The interface of claim 14 wherein the selecting circuit contained in the means for selecting each device further includes fourth and fifth logic circuits for respectively coupling the first and second outputs of the identification circuit to the first and second inputs of the first and second flip-flops, means for enabling said fourth and fifth logic circuits in response to no error signal being derived from the checking circuit, whereby the selecting circuit only activates and deactivates the device in response to the second output signals of the identification circuit while no error is detected in the characters received.

16. The interface of claim 15 wherein one of the transfer circuits in the means for selecting each device is coupled to first, second and other parallel outputs of the device to transmit, in parallel, the first bit, the second bit and the other bits of each character derived from the device to the transmitter circuit, two of the outputs of the transfer cirfcuit being coupled to the transmitter circuit via the checking circuit, said checking circuit including means for setting the first and second bits derived from the transmitter circuit to predetermined binary values in response to an error being detected in the first character received by the receiver circuit, so that the station transmitter/receiver circuit is informed of an error detected in a character recieved by the receiver circuit in response to the values of the said first and second bits in the first character transmitted by the transmitter circuit.

17. The interface of claim 16 wherein the control circuit in the means for selecting the first device includes a second OR gate having first and second inputs respectively responsive to the first output signal of the selecting circuit and an interrupt output of said one device and an output on which is derived the first output signal of the control circuit, whereby said one devive is activated as a data transmitter by a selecting signal which is derived as the first output signal of the control circuit in response to a signal being present at the first input of the second OR gate or an interrupt output signal from the device being present at the second input of the second OR gate.

18. The interface of claim 17 including means for causing the first bit of a character transmitted from the transmitter circuit for the one device to have a first binary value while an interrupt output is fed to the second input of the second OR gate, said checking circuit including a third OR gate having one input responsive to a first output of the device via the first logic circuit in the means for selecting the device and an output whch is coupled to the transmitter circuit as the first bit to be transmitted, whereby an interrupt output of the device causes an interrupt request first character having a first bit with the first binary value to be derived from the transmitter circuit.

19. The interface of claim 18 wherein the checking circuit includes a further flip-flop, a fourth OR gate, and an error detector having a set of parallel inputs responsive to parallel output bits of the receiver circuit and an output coupled to an input of the third OR gate and to an input of the flip-flop, the further flip-flop having an output coupled to an input of the fourth OR gate, means for feeding the output of the fourth OR gate to the transmitter circuit for the device as the second bit of a character transmitted from the transmitter circuit of the device, whereby the first and second bits derived from the transmitter circuit have the first value in response to an error being detected in a character received by the receiver circuit.

* * * * *